US012684443B2

(12) United States Patent　　　　(10) Patent No.: US 12,684,443 B2
Suh et al.　　　　　　　　　　　　　(45) Date of Patent:　　Jul. 14, 2026

(54) METHOD AND DEVICE FOR CELL (RE)SELECTION IN EFB-BASED NON-TERRESTRIAL NETWORK

(71) Applicants:HYUNDAI MOTOR COMPANY, Seoul (KR); KIA CORPORATION, Seoul (KR); INHA UNIVERSITY RESEARCH AND BUSINESS FOUNDATION, Incheon (KR)

(72) Inventors: Young Kil Suh, Hwaseong-si (KR); Ho Jun Kim, Hwaseong-si (KR); Ui Hyun Hong, Hwaseong-si (KR); Gene Back Hahn, Hwaseong-si (KR); Hyun Jin Kim, Hwaseong-si (KR); Duk Kyung Kim, Seoul (KR)

(73) Assignees: Hyundai Motor Company, Seoul (KR); Kia Corporation, Seoul (KR); INHA University Research and Business Foundation, Incheon (KR)

( * ) Notice: Subject to any disclaimer, the term of this patent is extended or adjusted under 35 U.S.C. 154(b) by 300 days.

(21) Appl. No.: 18/404,275

(22) Filed: Jan. 4, 2024

(65) Prior Publication Data

US 2024/0179598 A1　　　May 30, 2024

Related U.S. Application Data

(63) Continuation-in-part of application No. PCT/KR2022/009873, filed on Jul. 7, 2022.

(30) Foreign Application Priority Data

Jul. 7, 2021　　(KR) ........................ 10-2021-0089253

(51) Int. Cl.
　　*H04W 36/24*　　　(2009.01)
　　*H04W 36/00*　　　(2009.01)
　　　　　(Continued)

(52) U.S. Cl.
　　CPC ... *H04W 36/249* (2023.05); *H04W 36/00837* (2018.08); *H04W 36/0085* (2018.08);
　　　　　(Continued)

(58) Field of Classification Search
　　CPC ......... H04W 36/249; H04W 36/00837; H04W 36/0085; H04W 36/304; H04W 36/328;
　　　　　(Continued)

(56) References Cited

U.S. PATENT DOCUMENTS

2020/0052782 A1　　2/2020　Wang et al.
2020/0178135 A1　　6/2020　Yun et al.
　　　　(Continued)

FOREIGN PATENT DOCUMENTS

KR　　10-2020-0071004 A　　6/2020
KR　　10-2020-0086217 A　　7/2020
　　　　(Continued)

OTHER PUBLICATIONS

International Search Report dated Oct. 28, 2022 cited in International Patent Application No. PCT/KR2022/009873 (w/English translation).

(Continued)

*Primary Examiner* — Hashim S Bhatti
(74) *Attorney, Agent, or Firm* — Morgan Lewis & Bockius LLP

(57) ABSTRACT

A method and device for cell (re)selection in an EFB-based non-terrestrial network includes the steps of: receiving, from a satellite, cell selection configuration information including information about a cell service timer indicating when each of one or more cells can provide a communication service; decreasing the cell service timer of each of the one or more cells; measuring the reception quality of each of the one or (Continued)

more cells; and performing a cell selection procedure on the basis of the cell service timer of each of the one or more cells.

16 Claims, 15 Drawing Sheets

(51) Int. Cl.
  *H04W 36/30* (2009.01)
  *H04W 36/32* (2009.01)
  *H04W 84/06* (2009.01)

(52) U.S. Cl.
  CPC ....... *H04W 36/304* (2023.05); *H04W 36/328* (2023.05); *H04W 84/06* (2013.01)

(58) Field of Classification Search
  CPC ...... H04W 84/06; H04W 36/00; H04B 7/185; H04B 17/318; H04B 7/18513; H04B 7/18545
  See application file for complete search history.

(56) References Cited

U.S. PATENT DOCUMENTS

| | | | |
|---|---|---|---|
| 2021/0083760 A1 | 3/2021 | Schmidt et al. | |
| 2022/0086715 A1 | 3/2022 | Hong et al. | |
| 2023/0180089 A1* | 6/2023 | Panwar | H04W 36/30 370/331 |
| 2024/0064583 A1* | 2/2024 | Maattanen | H04W 36/0072 |

FOREIGN PATENT DOCUMENTS

| | | |
|---|---|---|
| KR | 10-2020-0130255 A | 11/2020 |
| KR | 10-2021-0040061 A | 4/2021 |
| WO | 2020/074887 A1 | 4/2020 |

OTHER PUBLICATIONS

3GPP TR 38.821, "3rd Generation Partnership Project; Technical Specification Group Radio Access Network; Solutions for NR to support non-terrestrial networks (NTN)," V16.0.0, Dec. 2019.

* cited by examiner

FIG. 1B

NG-RAN or 6G-RAN

UE

NR Uu or 6G Uu satellite gateway

RRU base station

NG or 6G core network

N6 data network

FIG. 4B coverage of satellite 2 coverage of satellite 1 cell4 cell3 cell2 cell1 travelling direction of satellite coverage of satellite 4 coverage of satellite 3

● : UE a

■ : UE b

▲ : UE c

✚ : UE d

✖ : UE e

METHOD AND DEVICE FOR CELL (RE)SELECTION IN EFB-BASED NON-TERRESTRIAL NETWORK

CROSS-REFERENCE TO RELATED APPLICATION

The present application is a continuation-in-part of currently pending International Patent Application No. PCT/KR2022/009873, filed Jul. 7, 2022, which claims priority to Korean Patent Application Number 10-2021-0089253, filed Jul. 7, 2021, the entire contents of which are incorporated herein for all purposes by these references.

BACKGROUND OF THE PRESENT DISCLOSURE

Field of the Present Disclosure

The present disclosure relates to cell selection in a non-terrestrial network, and more particularly, to a cell selection and/or reselection technique in an earth-moving beam (EMB)-based non-terrestrial network.

Description of Related Art

In order to provide enhanced communication services, a communication system (e.g., 5G communication network, 6G communication network, etc.) using a higher frequency band (e.g., a frequency band of 6 GHz or above) than a frequency band (e.g., a frequency band of 6 GHz or below) of the Long Term Evolution (LTE) communication system (or, LTE-A communication system) is being considered. The 5G communication network (e.g., new radio (NR) communication network) may support not only a frequency band of 6 GHz or below, but also a frequency band of 6 GHz or above, and may support various communication services and scenarios compared to the LTE communication network. For example, usage scenarios of the 5G communication network may include enhanced Mobile BroadBand (eMBB), Ultra Reliable Low Latency Communication (URLLC), Massive Machine Type Communication (mMTC), and the like. In addition, in order to provide enhanced communication services compared to the 5G communication network, the 6G communication network may support various and wide frequency bands and may be applied to various usage scenarios (e.g. terrestrial communication, non-terrestrial communication, sidelink communication, and the like).

The communication network (e.g. 5G communication network, 6G communication network, etc.) may provide communication services to terminals located on the ground. Recently, the demand for communication services for not only terrestrial but also non-terrestrial airplanes, drones, and satellites has been increasing, and for this purpose, technologies for a non-terrestrial network (NTN) have been discussed. The non-terrestrial network may be implemented based on 5G communication technology, 6G communication technology, and/or the like. For example, in the non-terrestrial network, communication between a satellite and a terrestrial communication node or a non-terrestrial communication node (e.g. airplane, drone, or the like) may be performed based on 5G communication technology, 6G communication technology, and/or the like. In the NTN, the satellite may perform functions of a base station in a communication network (e.g. 5G communication network, 6G communication network, and/or the like).

Meanwhile, in an NTN environment, satellites move at high speeds, necessitating cell selection and/or reselection for continuous service provision. Additionally, in NTN, the distance between the satellite and a User Equipment (UE) may be significantly larger than the cell size, and variations in the distance between the satellite and the UE may not be significant within a cell coverage. Therefore, the Reference Signal Received Power (RSRP)-based legacy scheme may not provide sufficient performance, unlike in terrestrial networks (TNs). Furthermore, aspects of cell maintenance time and/or satellite maintenance time may differ in an Earth Moving Beam (EMB)-based NTN and an Earth Fixed Beam (EFB)-based NTN. Consequently, an efficient cell selection and/or reselection method is required that takes into account the characteristics of the EMB-based NTN environment.

The information disclosed in this Background of the Invention section is only for enhancement of understanding of the general background of the invention and may not be taken as an acknowledgement or any form of suggestion that this information forms the related art already known to a person skilled in the art.

BRIEF SUMMARY

Various aspects of the present disclosure are directed to providing a method and an apparatus for cell selection in a non-terrestrial network.

A method of a user equipment (UE), according to various exemplary embodiments of the present disclosure for achieving the above-described objective, may include: decreasing a cell service timer for each of at least one cell, which indicates a time during which communication services can be provided for each of the at least one cell; determining a candidate cell set including one or more cells for which the cell service timer exceeds a first preset value; and performing a cell selection procedure based on the cell service timer of each of the one or more cells belonging to the candidate cell set.

The method may further comprise, before the decreasing of the cell service timer for each of at least one cell, which indicates the time during which communication services can be provided for each of the at least one cell, receiving configuration information of a cell service timer for each of the at least one cell from the satellite, wherein the configuration information of the cell service timer for each of the at least one cell includes at least one of a value of the cell service timer for each of the at least one cell, location information of the UE, ephemeris information of the satellite, or elevation angle information of the satellite.

The method may further comprise, before the decreasing of the cell service timer for each of at least one cell, which indicates the time during which communication services can be provided for each of the at least one cell, obtaining a value of the cell service timer for each of the at least one cell, which is preset in the UE.

The performing of the cell selection procedure based on the cell service timer of each of the one or more cells belonging to the candidate cell set may include: determining whether a number of cells belonging to the candidate cell set is 1; and determining whether a reception quality of a first cell belonging to the candidate cell set exceeds a preset second value, wherein upon concluding the number of cells belonging to the candidate cell set is 1 and the reception quality of the first cell exceeds the preset second value, the first cell belonging to the candidate cell set is selected.

The performing of the cell selection procedure based on the cell service timer of each of the one or more cells belonging to the candidate cell set may include: determining whether a number of cells belonging to the candidate cell set is 1; in response that the number of cells belonging to the candidate cell set is not 1, determining a distance between a center of each of a plurality of cells belonging to the candidate cell set and a nadir of the satellite; and selecting a candidate cell based on the distance between the center of each of the plurality of cells and the nadir of the satellite and the cell service timer of the at least one cell.

The performing of the cell selection procedure based on the cell service timer of each of the one or more cells belonging to the candidate cell set may include: determining whether a number of cells belonging to the candidate cell set is 1; in response that the number of cells belonging to the candidate cell set is not 1, determining traffic load information of a plurality of cells belonging to the candidate cell set; and selecting a candidate cell based on the traffic load information of the plurality of cells and the cell service timer of the at least one cell.

The performing of the cell selection procedure based on the cell service timer of each of the one or more cells belonging to the candidate cell set may include: determining whether a reception quality of the candidate cell exceeds a second preset value.

The method may further include: receiving variable measurement configuration information from a satellite; and performing variable measurement procedures instead of general measurement procedures based on the variable measurement configuration information, wherein a measurement periodicity for the variable measurement procedures is shorter than a measurement periodicity for the general measurement procedures.

The variable measurement configuration information may include intermittent measurement configuration information and frequent measurement configuration information, intermittent measurement procedures may be performed based on the intermittent measurement configuration information when a cell service timer of a cell selected in the cell selection procedure exceeds a threshold, and frequent measurement procedures may be performed based on the frequent measurement configuration information when the cell service timer of the cell selected in the cell selection procedure is equal to or less than the threshold.

The method may further comprise, after the performing of the cell selection procedure, triggering a cell reselection procedure when a cell service timer of a cell selected in the cell selection procedure is equal to or less than a threshold.

A user equipment (UE), according to various exemplary embodiments of the present disclosure for achieving the above-described objective, may include: a processor; and a memory storing one or more instructions executable by the processor, wherein the one or more instructions may be executed to perform: decreasing a cell service timer for each of at least one cell, which indicates a time during which communication services can be provided for each of the at least one cell; determining a candidate cell set including one or more cells for which the cell service timer exceeds a first preset value; and performing a cell selection procedure based on the cell service timer of each of the one or more cells belonging to the candidate cell set.

The one or more instructions may be further executed to perform, before the decreasing of the cell service timer for each of at least one cell, which indicates the time during which communication services can be provided for each of the at least one cell, receiving configuration information of a cell service timer for each of the at least one cell from the satellite, wherein the configuration information of the cell service timer for each of the at least one cell includes at least one of a value of the cell service timer for each of the at least one cell, location information of the UE, ephemeris information of the satellite, or elevation angle information of the satellite.

The one or more instructions may be further executed to perform, before the decreasing of the cell service timer for each of at least one cell, which indicates the time during which communication services can be provided for each of the at least one cell, obtaining a value of the cell service timer for each of the at least one cell, which is preset in the UE.

The one or more instructions may be further executed to perform: determining whether a number of cells belonging to the candidate cell set is 1; and determining whether a reception quality of a first cell belonging to the candidate cell set exceeds a preset second value, wherein upon concluding the number of cells belonging to the candidate cell set is 1 and the reception quality of the first cell exceeds the preset second value, the first cell belonging to the candidate cell set is selected.

The one or more instructions may be further executed to perform: determining whether a number of cells belonging to the candidate cell set is 1; in response that the number of cells belonging to the candidate cell set is not 1, determining a distance between a center of each of a plurality of cells belonging to the candidate cell set and a nadir of the satellite; and selecting a candidate cell based on the distance between the center of each of the plurality of cells and the nadir of the satellite and the cell service timer of the at least one cell.

The one or more instructions may be further executed to perform: determining whether a number of cells belonging to the candidate cell set is 1; in response that the number of cells belonging to the candidate cell set is not 1, determining traffic load information of a plurality of cells belonging to the candidate cell set; and selecting a candidate cell based on the traffic load information of the plurality of cells and the cell service timer of the at least one cell.

The one or more instructions may be further executed to perform: determining whether a reception quality of the candidate cell exceeds a second preset value.

The one or more instructions may be further executed to perform: receiving variable measurement configuration information from a satellite; and performing variable measurement procedures instead of general measurement procedures based on the variable measurement configuration information, wherein a measurement periodicity for the variable measurement procedures is shorter than a measurement periodicity for the general measurement procedures.

The variable measurement configuration information may include intermittent measurement configuration information and frequent measurement configuration information, intermittent measurement procedures may be performed based on the intermittent measurement configuration information when a cell service timer of a cell selected in the cell selection procedure exceeds a threshold, and frequent measurement procedures may be performed based on the frequent measurement configuration information when the cell service timer of the cell selected in the cell selection procedure is equal to or less than the threshold.

The one or more instructions may be further executed to perform, after the performing of the cell selection procedure, triggering a cell reselection procedure when a cell service timer of a cell selected in the cell selection procedure is equal to or less than a threshold.

According to an exemplary embodiment of the present disclosure, a satellite may configure timer(s) for cell selection and/or reselection procedures in a UE. The UE can perform each cell selection and/or reselection procedure based on the timer(s). Additionally, measurement procedures may be performed by the UE variably based on the timer(s). Accordingly, the cell selection procedures and/or measurement procedures in a non-terrestrial network can be performed efficiently, leading to an improvement in the performance of the non-terrestrial network.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1B is a conceptual diagram illustrating various exemplary embodiments of a non-terrestrial network.

FIG. 2B is a conceptual diagram illustrating various exemplary embodiments of a non-terrestrial network.

FIG. 4A is a conceptual diagram illustrating various exemplary embodiments of a protocol stack of a user plane in a transparent payload-based non-terrestrial network.

FIG. 4B is a conceptual diagram illustrating various exemplary embodiments of a protocol stack of a control plane in a transparent payload-based non-terrestrial network.

Figure 1A:
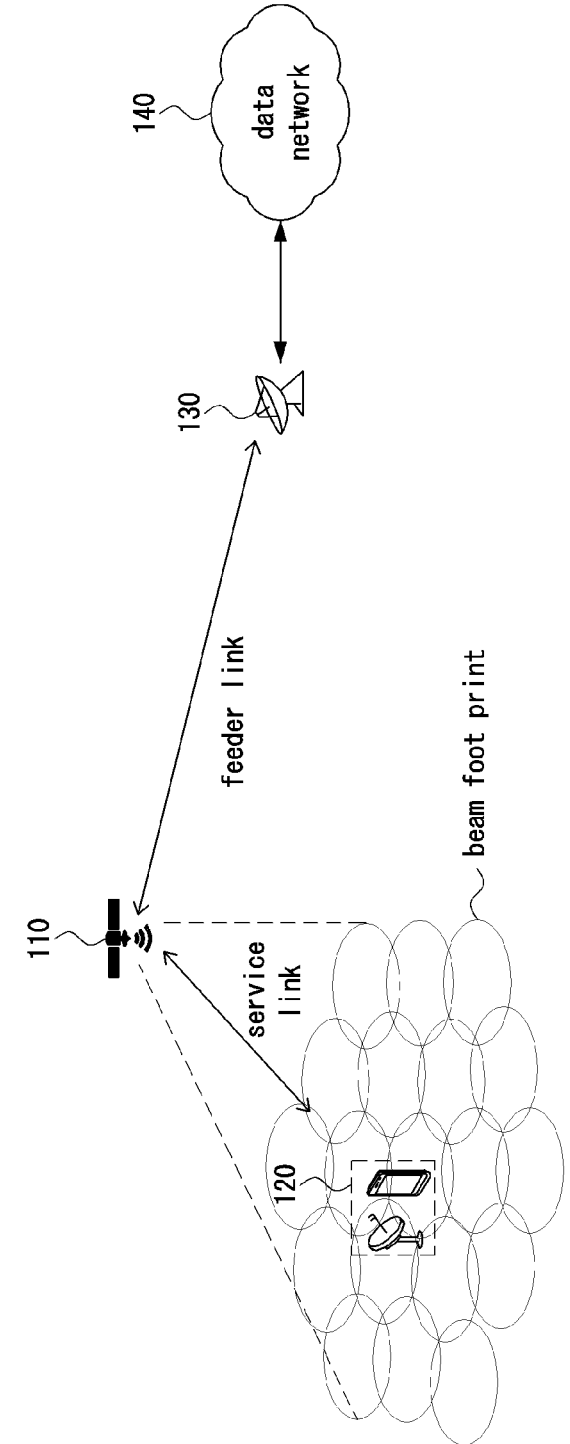
FIG. 1A is a conceptual diagram illustrating various exemplary embodiments of a non-terrestrial network.

It may be understood that the appended drawings are not necessarily to scale, presenting a somewhat simplified representation of various features illustrative of the basic principles of the present disclosure. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the contrary, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

In exemplary embodiments of the present disclosure, "(re)transmission" may refer to "transmission", "retransmission", or "transmission and retransmission", "(re)configuration" may refer to "configuration", "reconfiguration", or "configuration and reconfiguration", "(re)connection" may refer to "connection", "reconnection", or "connection and reconnection", "(re)access" may mean "access", "re-access", or "access and re-access", and "(re)selection" may mean "selection", "reselection", or "selection and reselection".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for describing particular embodiments only and is not intended to be limiting of the present disclosure. As used herein, the singular forms are intended to include the plural forms as well, unless the context clearly indicates otherwise. It will be further understood that the terms "comprise" and/or "include" when used herein, specify the presence of stated features, integers, steps, operations, elements, components or combinations thereof, but do not preclude the presence or addition of one or more other features, integers, steps, operations, elements, components, and/or combinations thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted. In addition to the exemplary embodiments explicitly described in the present disclosure, operations may be performed according to a combination of the exemplary embodiments, extensions of the exemplary embodiments, and/or modifications of the exemplary embodiments. Performance of some operations may be omitted, and the order of performance of operations may be changed.

Even when a method (e.g. transmission or reception of a signal) performed at a first communication node among communication nodes is described, a corresponding second communication node may perform a method (e.g. reception or transmission of the signal) corresponding to the method performed at the first communication node. That is, when an operation of a user equipment (UE) is described, a base station corresponding to the UE may perform an operation corresponding to the operation of the UE. Conversely, when an operation of a base station is described, a UE corresponding to the base station may perform an operation corresponding to the operation of the base station. In a non-terrestrial network (NTN) (e.g. payload-based NTN), operations of a base station may refer to operations of a satellite, and operations of a satellite may refer to operations of a base station.

The base station may refer to a NodeB, evolved NodeB (eNodeB), next generation node B (gNodeB), gNB, device, apparatus, node, communication node, base transceiver station (BTS), radio remote head (RRH), transmission reception point (TRP), radio unit (RU), road side unit (RSU), radio transceiver, access point, access node, and/or the like. The UE may refer to a terminal, device, apparatus, node, communication node, end node, access terminal, mobile terminal, station, subscriber station, mobile station, portable subscriber station, on-broad unit (OBU), and/or the like.

In exemplary embodiments, signaling may be at least one of higher layer signaling, medium access control (MAC) signaling, or physical (PHY) signaling. Messages used for higher layer signaling may be referred to as 'higher layer messages' or 'higher layer signaling messages'. Messages used for MAC signaling may be referred to as 'MAC messages' or 'MAC signaling messages'. Messages used for PHY signaling may be referred to as 'PHY messages' or 'PHY signaling messages'. The higher layer signaling may refer to a transmission and reception operation of system information (e.g. master information block (MIB), system information block (SIB)) and/or RRC messages. The MAC signaling may refer to a transmission and reception operation of a MAC control element (CE). The PHY signaling may refer to a transmission and reception operation of control information (e.g. downlink control information (DCI), uplink control information (UCI), and sidelink control information (SCI)).

In exemplary embodiments, "an operation (e.g. transmission operation) is configured" may mean that "configuration information (e.g. information element(s) or parameter(s)) for the operation and/or information indicating to perform the operation is signaled". "Information element(s) (e.g. parameter(s)) are configured" may mean that "corresponding information element(s) are signaled".

A communication system may include at least one of a terrestrial network, non-terrestrial network, 4G communication network (e.g. long-term evolution (LTE) communication network), 5G communication network (e.g. new radio (NR) communication network), or 6G communication network. Each of the 4G communications network, 5G communications network, and 6G communications network may include a terrestrial network and/or a non-terrestrial network. The non-terrestrial network may operate based on at least one communication technology among the LTE communication technology, 5G communication technology, or 6G communication technology. The non-terrestrial network may provide communication services in various frequency bands.

The communication network to which exemplary embodiments are applied is not limited to the content described below, and the exemplary embodiments may be applied to various communication networks (e.g. 4G communication network, 5G communication network, and/or 6G communication network). Here, a communication network may be used in the same sense as a communication system.

FIG. 1A is a conceptual diagram illustrating a first exemplary embodiment of a non-terrestrial network.

As shown in FIG. 1A, a non-terrestrial network (NTN) may include a satellite 110, a communication node 120, a gateway 130, a data network 140, and the like. A unit including the satellite 110 and the gateway 130 may correspond to a remote radio unit (RRU). The NTN shown in FIG. 1A may be an NTN based on a transparent payload. The satellite 110 may be a low earth orbit (LEO) satellite, a medium earth orbit (MEO) satellite, a geostationary earth orbit (GEO) satellite, a high elliptical orbit (HEO) satellite, or an unmanned aircraft system (UAS) platform. The UAS platform may include a high altitude platform station (HAPS). A non-GEO satellite may be an LEO satellite and/or MEO satellite.

The communication node 120 may include a communication node (e.g. a user equipment (UE) or a terminal) located on a terrestrial site and a communication node (e.g. an airplane, a drone) located on a non-terrestrial space. A service link may be established between the satellite 110 and the communication node 120, and the service link may be a radio link. The satellite 110 may provide communication services to the communication node 120 using one or more beams. The shape of a footprint of the beam of the satellite 110 may be elliptical or circular.

The communication node 120 may perform communications (e.g. downlink communication and uplink communication) with the satellite 110 using 4G communication technology, 5G communication technology, and/or 6G communication technology. The communications between the satellite 110 and the communication node 120 may be performed using an NR-Uu interface and/or 6G-Uu interface. When dual connectivity (DC) is supported, the communication node 120 may be connected to other base stations (e.g. base stations supporting 4G, 5G, and/or 6G functionality) as well as the satellite 110, and perform DC operations based on the techniques defined in 4G, 5G, and/or 6G technical specifications.

The gateway 130 may be located on a terrestrial site, and a feeder link may be established between the satellite 110 and the gateway 130. The feeder link may be a radio link. The gateway 130 may be referred to as a 'non-terrestrial network (NTN) gateway'. The communications between the satellite 110 and the gateway 130 may be performed based on an NR-Uu interface, a 6G-Uu interface, or a satellite radio interface (SRI). The gateway 130 may be connected to the data network 140. There may be a 'core network' between the gateway 130 and the data network 140. In the instant case, the gateway 130 may be connected to the core network, and the core network may be connected to the data network 140. The core network may support the 4G communication technology, 5G communication technology, and/or 6G communication technology. For example, the core network may include an access and mobility management function (AMF), a user plane function (UPF), a session management function (SMF), and the like. The communications between the gateway 130 and the core network may be performed based on an NG-C/U interface or 6G-C/U interface.

Figure 1B:
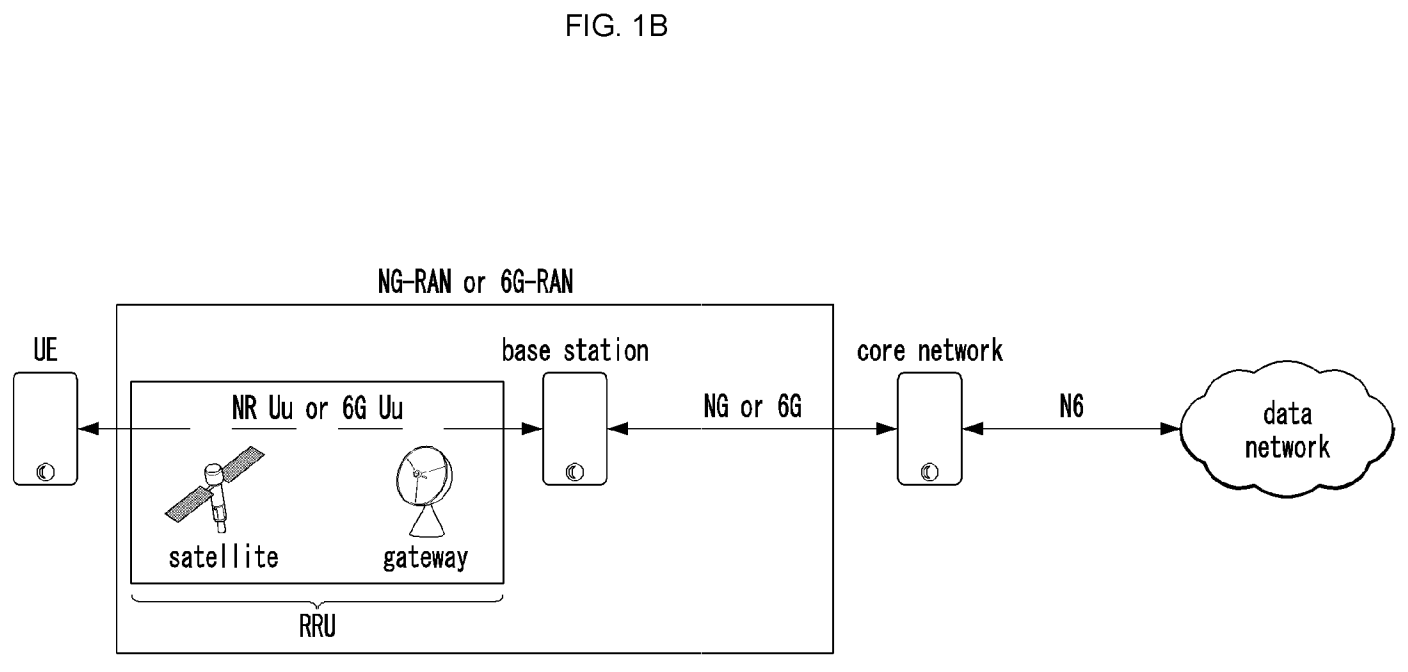

As shown in an exemplary embodiment of FIG. 1B, there may be a 'core network' between the gateway 130 and the data network 140 in a transparent payload-based NTN.

FIG. 1B is a conceptual diagram illustrating a second exemplary embodiment of a non-terrestrial network.

As shown in FIG. 1B, the gateway may be connected to the base station, the base station may be connected to the core network, and the core network may be connected to the data network. Each of the base station and core network may support the 4G communication technology, 5G communication technology, and/or 6G communication technology. The communications between the gateway and the base station may be performed based on an NR-Uu interface or 6G-Uu interface, and the communications between the base station and the core network (e.g., AMF, UPF, SMF, and the like) may be performed based on an NG-C/U interface or 6G-C/U interface.

Figure 2A:
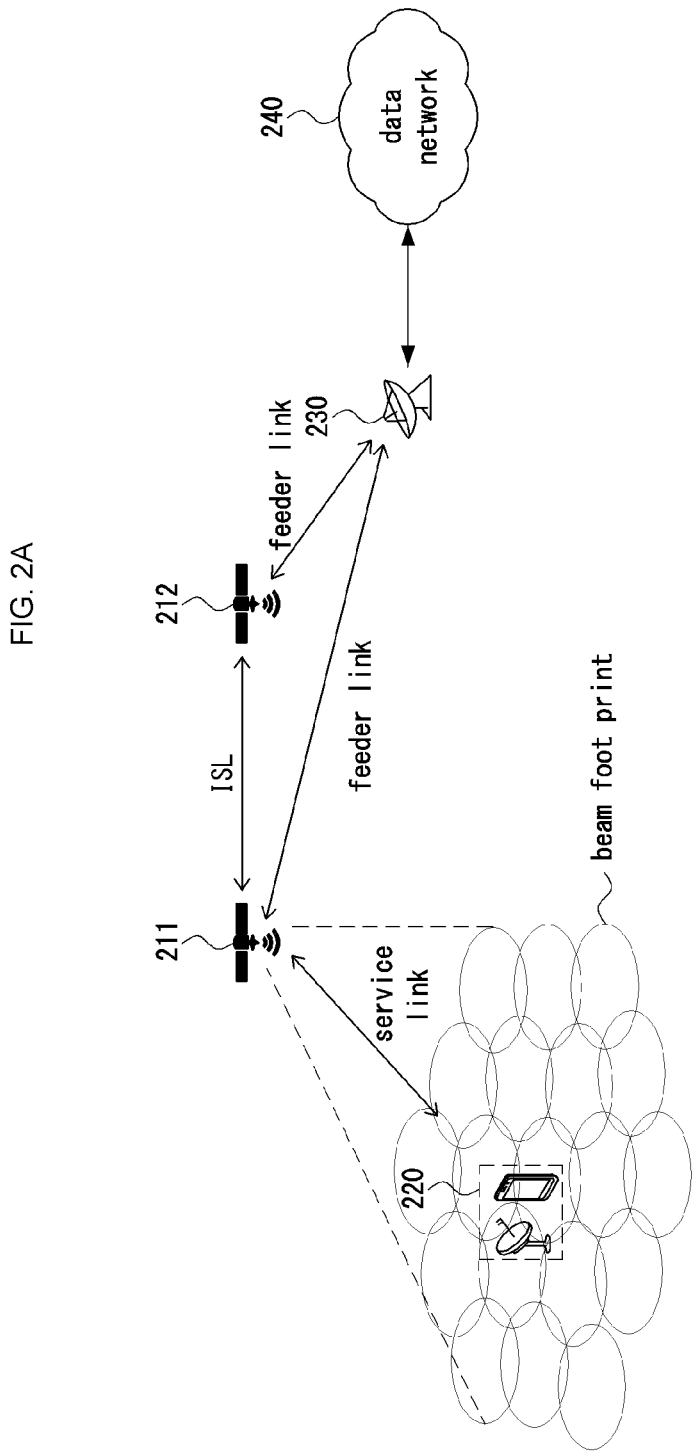
FIG. 2A is a conceptual diagram illustrating various exemplary embodiments of a non-terrestrial network.

FIG. 2A is a conceptual diagram illustrating a third exemplary embodiment of a non-terrestrial network.

As shown in FIG. 2A, a non-terrestrial network may include a first satellite 211, a second satellite 212, a communication node 220, a gateway 230, a data network 240, and the like. The NTN shown in FIG. 2A may be a regenerative payload based NTN. For example, each of the satellites 211 and 212 may perform a regenerative operation (e.g. demodulation, decoding, re-encoding, re-modulation, and/or filtering operation) on a payload received from other entities (e.g. the communication node 220 or the gateway 230), and transmit the regenerated payload.

Each of the satellites 211 and 212 may be a LEO satellite, a MEO satellite, a GEO satellite, a HEO satellite, or a UAS platform. The UAS platform may include a HAPS. The satellite 211 may be connected to the satellite 212, and an inter-satellite link (ISL) may be established between the satellite 211 and the satellite 212. The ISL may operate in an RF frequency band or an optical band. The ISL may be established optionally. The communication node 220 may include a terrestrial communication node (e.g. UE or terminal) and a non-terrestrial communication node (e.g. airplane or drone). A service link (e.g. radio link) may be established between the satellite 211 and communication node 220. The satellite 211 may provide communication services to the communication node 220 using one or more beams.

The communication node 220 may perform communications (e.g. downlink communication or uplink communication) with the satellite 211 using the 4G communication technology, 5G communication technology, and/or 6G communication technology. The communications between the satellite 211 and the communication node 220 may be performed using an NR-Uu interface or 6G-Uu interface. When DC is supported, the communication node 220 may be connected to other base stations (e.g. base stations supporting 4G, 5G, and/or 6G functionality) as well as the satellite 211, and may perform DC operations based on the techniques defined in 4G, 5G, and/or 6G technical specifications.

The gateway 230 may be located on a terrestrial site, a feeder link may be established between the satellite 211 and the gateway 230, and a feeder link may be established between the satellite 212 and the gateway 230. The feeder link may be a radio link. When the ISL is not established between the satellite 211 and the satellite 212, the feeder link between the satellite 211 and the gateway 230 may be established mandatorily. The communications between each of the satellites 211 and 212 and the gateway 230 may be performed based on an NR-Uu interface, a 6G-Uu interface, or an SRI. The gateway 230 may be connected to the data network 240.

Figure 2B:
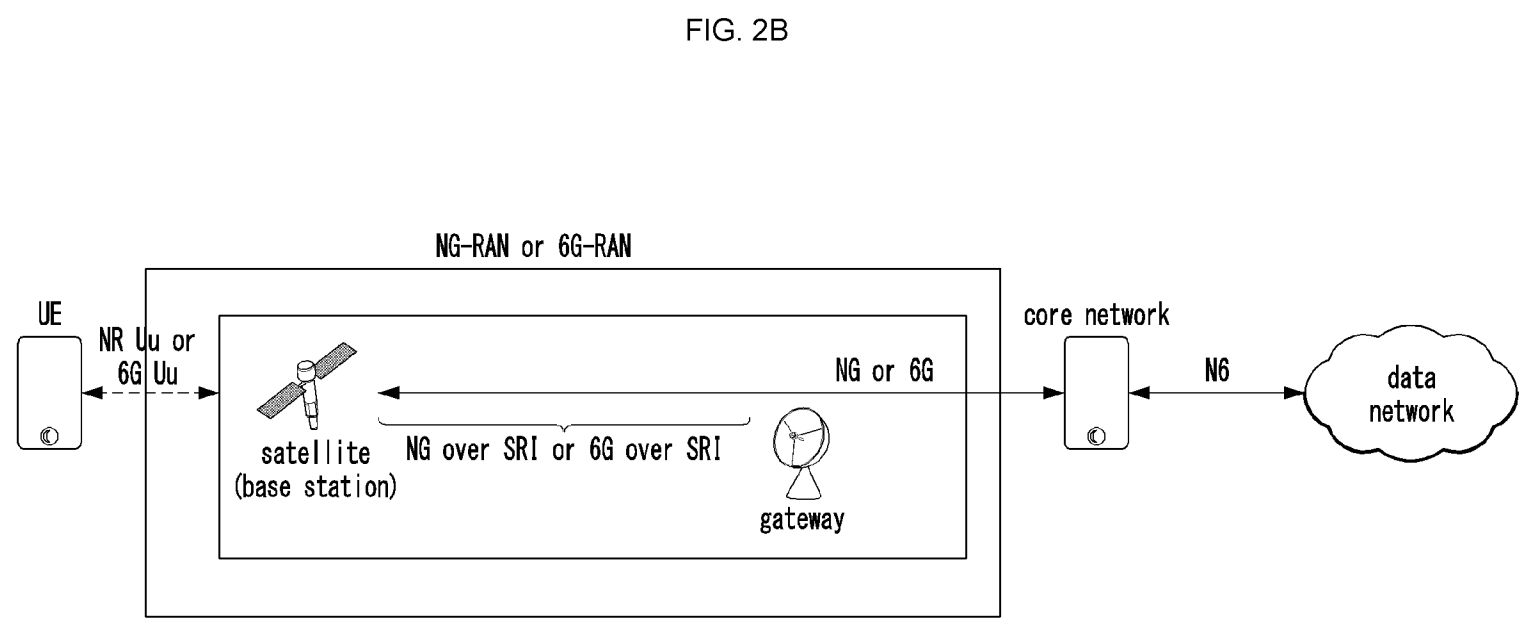
Figure 2C:
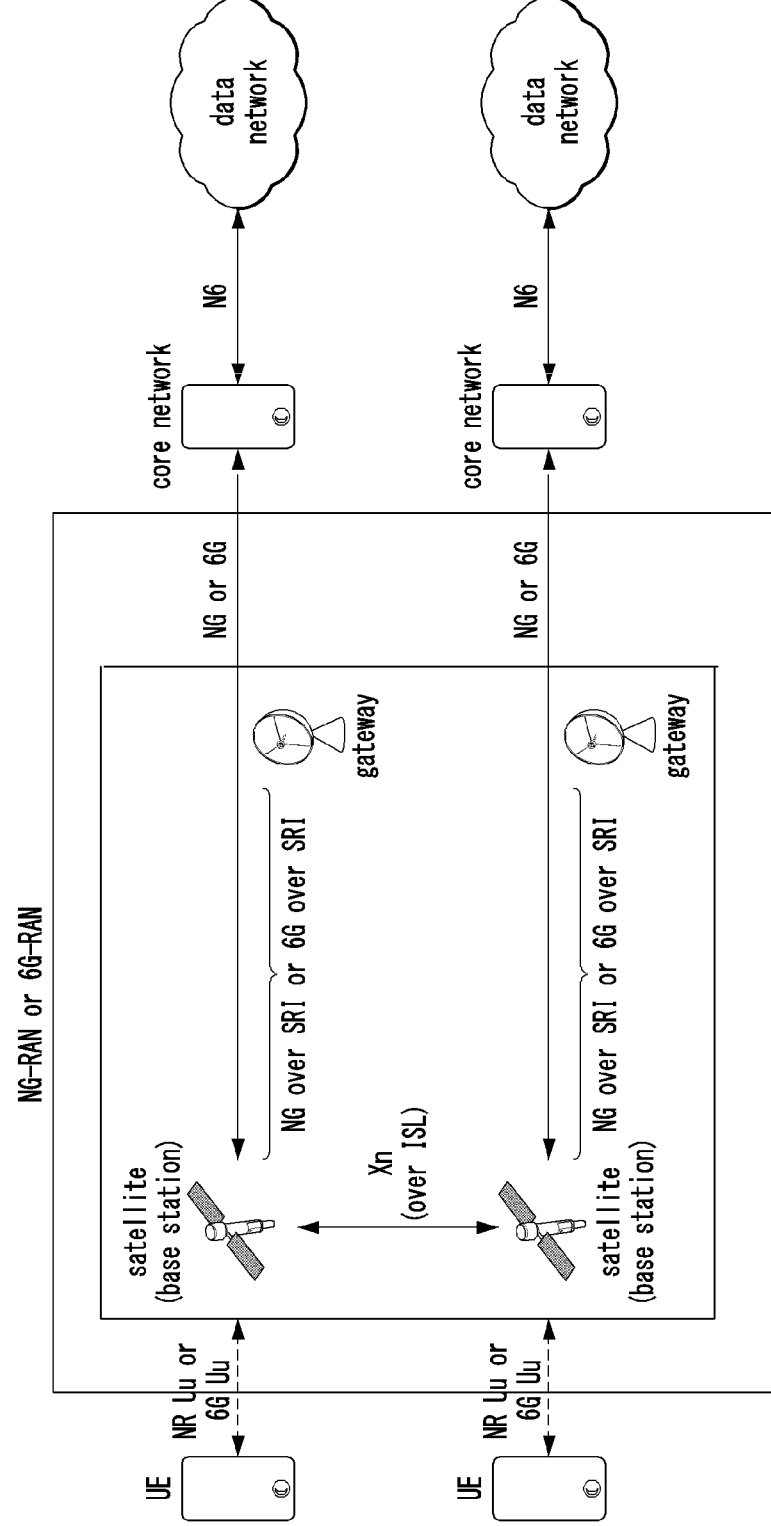
FIG. 2C is a conceptual diagram illustrating various exemplary embodiments of a non-terrestrial network.

As shown in exemplary embodiments of FIG. 2B and FIG. 2C, there may be a 'core network' between the gateway 230 and the data network 240.

FIG. 2B is a conceptual diagram illustrating a fourth exemplary embodiment of a non-terrestrial network, and FIG. 2C is a conceptual diagram illustrating a fifth exemplary embodiment of a non-terrestrial network.

As shown in FIG. 2B and FIG. 2C, the gateway may be connected to the core network, and the core network may be connected to the data network. The core network may support the 4G communication technology, 5G communication technology, and/or 6G communication technology. For example. The core network may include AMF, UPF, SMF, and the like. Communication between the gateway and the core network may be performed based on an NG-C/U interface or 6G-C/U interface. Functions of a base station may be performed by the satellite. That is, the base station may be located on the satellite. A payload may be processed by the base station located on the satellite. Base stations located on different satellites may be connected to the same core network. One satellite may have one or more base stations. In the non-terrestrial network of FIG. 2B, an ISL between satellites may not be established, and in the non-terrestrial network of FIG. 2C, an ISL between satellites may be established.

Meanwhile, the entities (e.g. satellite, base station, UE, communication node, gateway, and the like) constituting the non-terrestrial network shown in FIGS. 1A, 1B, 2A, 2B, and/or 2C may be configured as follows.

Figure 3:
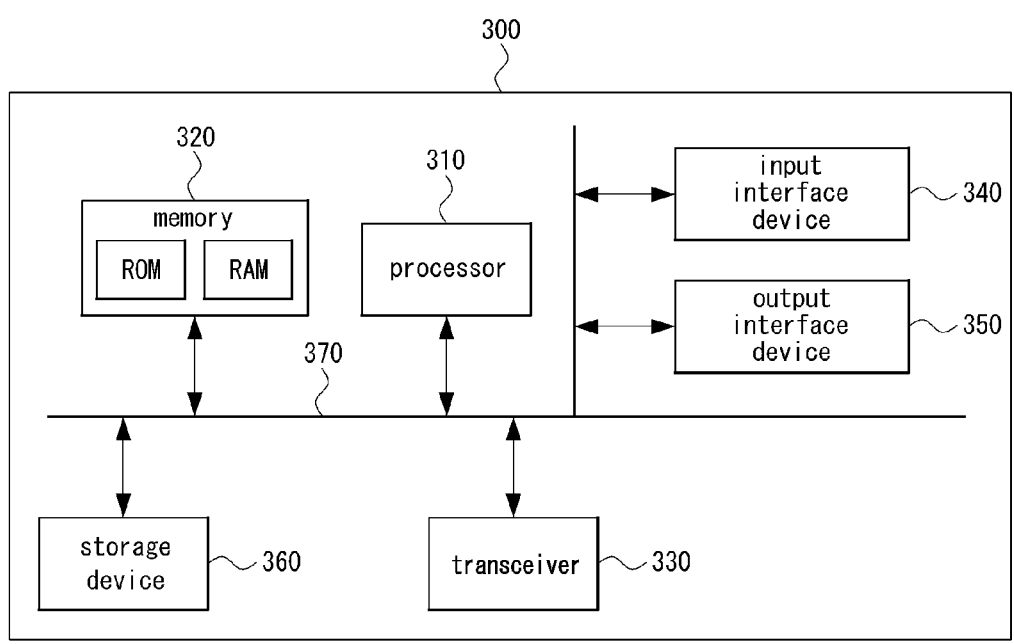
FIG. 3 is a block diagram illustrating various exemplary embodiments of an entity constituting a non-terrestrial network.

FIG. 3 is a block diagram illustrating a first exemplary embodiment of an entity constituting a non-terrestrial network.

As shown in FIG. 3, an entity 300 may include at least one processor 310, a memory 320, and a transceiver 330 connected to a network to perform communication. In addition, the entity 300 may further include an input interface device 340, an output interface device 350, a storage device 360, and the like. The components included in the entity 300 may be connected by a bus 370 to communicate with each other.

However, each component included in the entity 300 may be connected to the processor 310 through a separate interface or a separate bus instead of the common bus 370. For example, the processor 310 may be connected to at least one of the memory 320, the transceiver 330, the input interface device 340, the output interface device 350, and the storage device 360 through a dedicated interface.

The processor 310 may execute at least one instruction stored in at least one of the memory 320 and the storage device 360. The processor 310 may refer to a central processing unit (CPU), a graphics processing unit (GPU), or a dedicated processor on which the methods according to the exemplary embodiments of the present disclosure are performed. Each of the memory 320 and the storage device 360 may be referred to as 'scenario C1'. When the satellite 110 in the NTN shown in FIG. 1A and/or FIG. 1B is an LEO satellite having beams moving with the satellite, this may be referred to as 'scenario C2'. When the satellites 211 and 212 in the NTN shown in FIG. 2A, FIG. 2B, and/or FIG. 2C are LEO satellites with steerable beams, this may be referred to as 'scenario D1'. When the satellites 211 and 212 in the NTN shown in FIG. 2A, FIG. 2B, and/or FIG. 2C are LEO satellites having beams moving with the satellites, this may be referred to as 'scenario D2'. Parameters for the scenarios defined in Table 1 may be defined as shown in Table 2 below.

Parameters for the NTN reference scenarios defined in Table 1 may be defined as shown in Table 2 below.

TABLE 2

|  | Scenarios A and B | Scenarios C and D |
|---|---|---|
| Altitude | 35,786 km | 600 km<br>1,200 km |
| Spectrum (service link) | <6 GHz (e.g. 2 GHz)<br>>6 GHz (e.g. DL 20 GHz, UL 30 GHz) | |
| Maximum channel bandwidth capability (service link) | 30 MHz for band <6 GHz<br>1 GHz for band >6 GHz | |
| Maximum distance between satellite and communication node (e.g. UE) at the minimum elevation angle | 40,581 km | 1,932 km (altitude of 600 km)<br>3,131 km (altitude of 1,200 km) |
| Maximum round trip delay (RTD) (only propagation delay) | Scenario A: 541.46 ms (service and feeder links)<br>Scenario B: 270.73 ms (only service link) | Scenario C: (transparent payload: service and feeder links) −5.77 ms (altitude of 60 0 km) −41.77 ms (altitude of 1,200 km)<br>Scenario D: (regenerative payload: only service link) −12.89 ms (altitude of 600 km) −20.89 ms (altitude of 1,200 km) |
| Maximum differential delay within a cell | 10.3 ms | 3.12 ms (altitude of 600 km)<br>3.18 ms (altitude of 1,200 km) |
| Service link | NR defined in 3GPP | |
| Feeder link | Radio interfaces defined in 3GPP or non-3GPP | | may be configured as at least one of a volatile storage medium and a nonvolatile storage medium. For example, the memory 320 may be configured with at least one of a read only memory (ROM) and a random access memory (RAM).

Meanwhile, NTN reference scenarios may be defined as shown in Table 1 below.

TABLE 1

|  | NTN shown in FIG. 1 | NTN shown in FIG. 2 |
|---|---|---|
| GEO | Scenario A | Scenario B |
| LEO (steerable beams) | Scenario C1 | Scenario D1 |
| LEO (beams moving with satellite) | Scenario C2 | Scenario D2 |

When the satellite 110 in the NTN shown in FIG. 1A and/or FIG. 1B is a GEO satellite (e.g. a GEO satellite that supports a transparent function), this may be referred to as 'scenario A'. When the satellites 211 and 212 in the NTN shown in FIG. 2A, FIG. 2B, and/or FIG. 2C are GEO satellites (e.g. GEOs that support a regenerative function), this may be referred to as 'scenario B'.

When the satellite 110 in the NTN shown in FIG. 1A and/or FIG. 1B is an LEO satellite with steerable beams, this In addition, in the scenarios defined in Table 1, delay constraints may be defined as shown in Table 3 below.

TABLE 3

|  | Scenario A | Scenario B | Scenario C1-2 | Scenario D1-2 |
|---|---|---|---|---|
| Satellite altitude | 35,786 km | | 600 km | |
| Maximum RTD in a radio interface between base station and UE | 541.75 ms (worst case) | 270.57 ms | 28.41 ms | 12.88 ms |
| Minimum RTD in a radio interface between base station and UE | 477.14 ms | 238.57 ms | 8 ms | 4 ms |

Figure 4A:
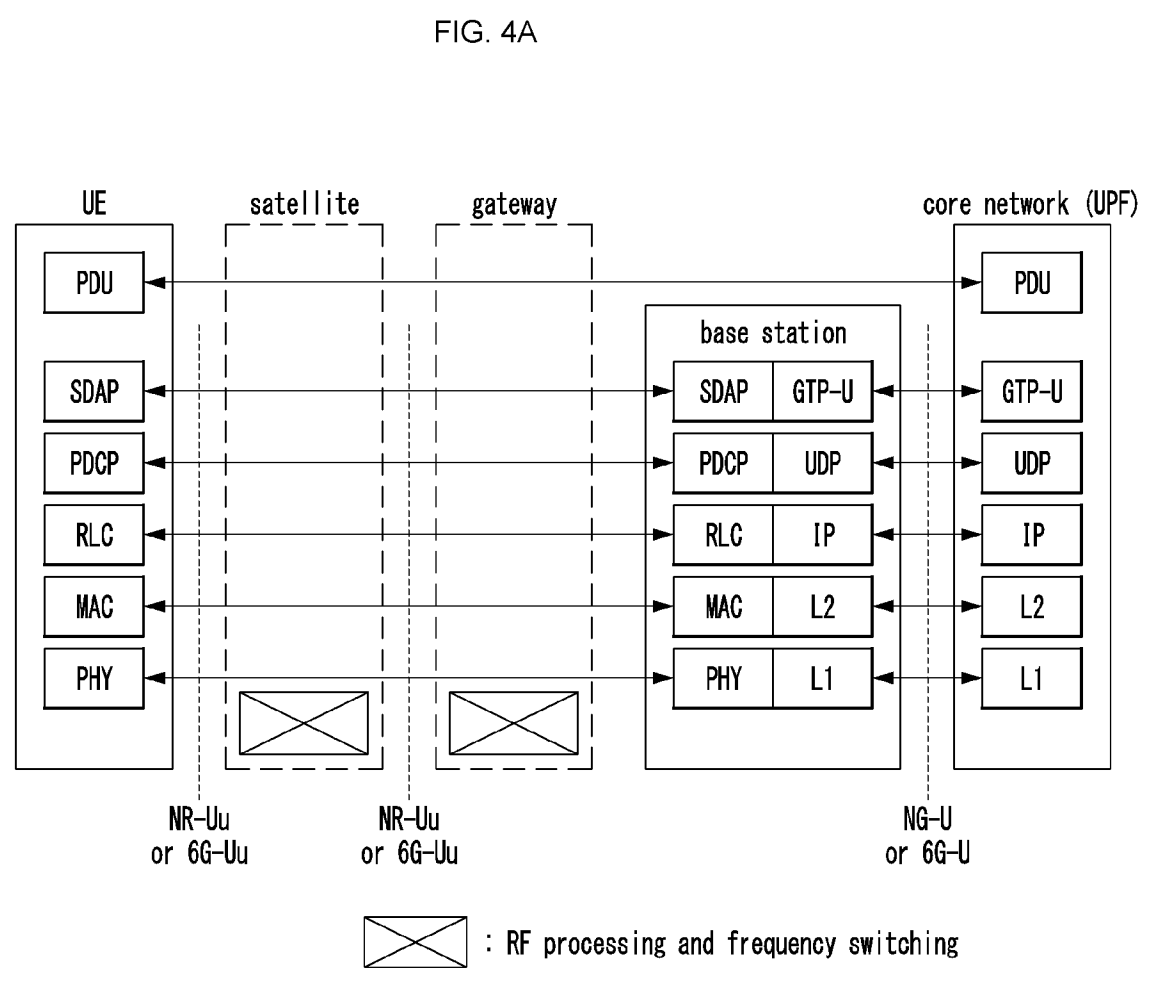
Figure 4B:
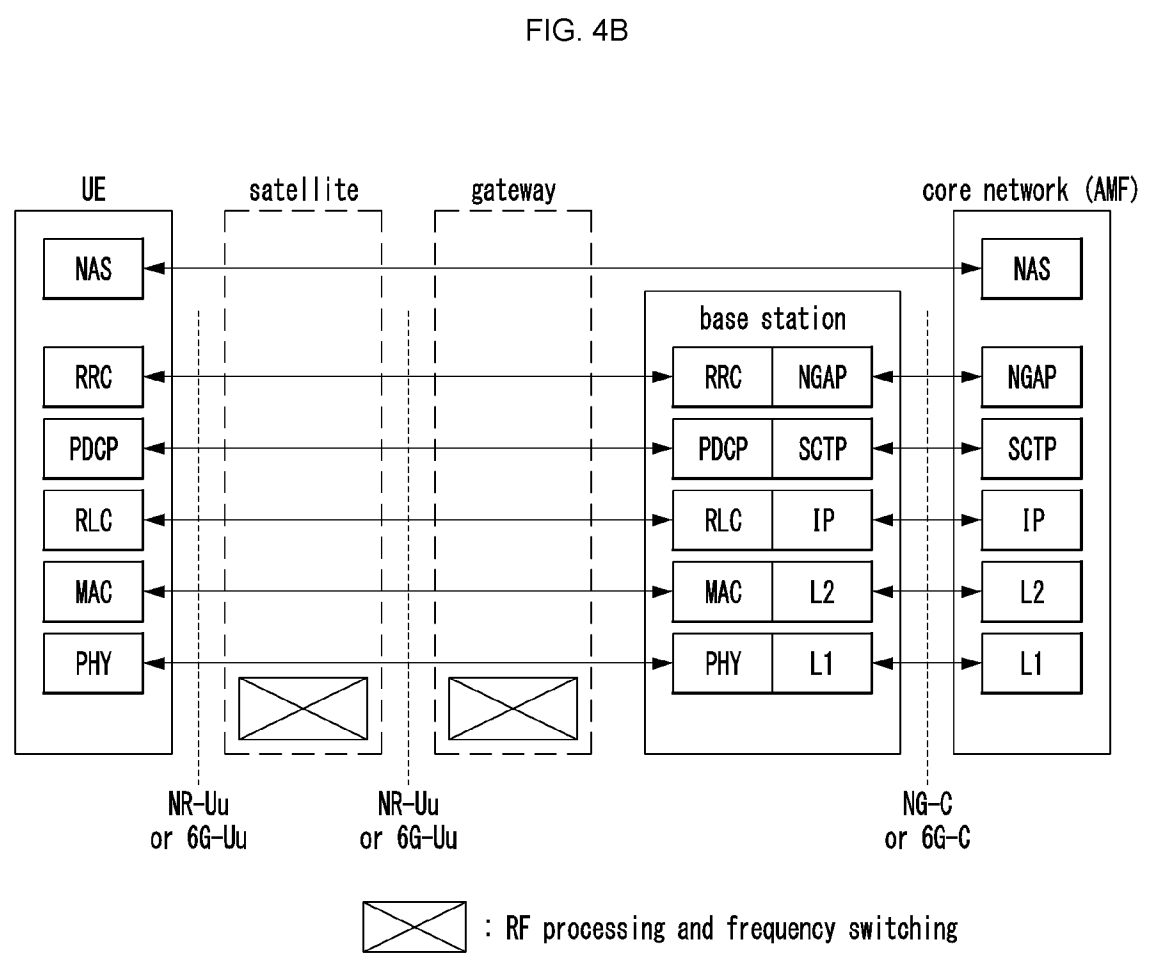

FIG. 4A is a conceptual diagram illustrating a first exemplary embodiment of a protocol stack of a user plane in a transparent payload-based non-terrestrial network, and FIG. 4B is a conceptual diagram illustrating a first exemplary embodiment of a protocol stack of a control plane in a transparent payload-based non-terrestrial network.

As shown in FIGS. 4A and 4B, user data may be transmitted and received between a UE and a core network (e.g. UPF), and control data (e.g. control information) may be transmitted and received between the UE and the core network (e.g. AMF). Each of the user data the and control data may be transmitted and received through a satellite and/or gateway. The protocol stack of the user plane shown in FIG. 4A may be applied identically or similarly to a 6G communication network. The protocol stack of the control plane shown in FIG. 4B may be applied identically or similarly to a 6G communication network.

Figure 5A:
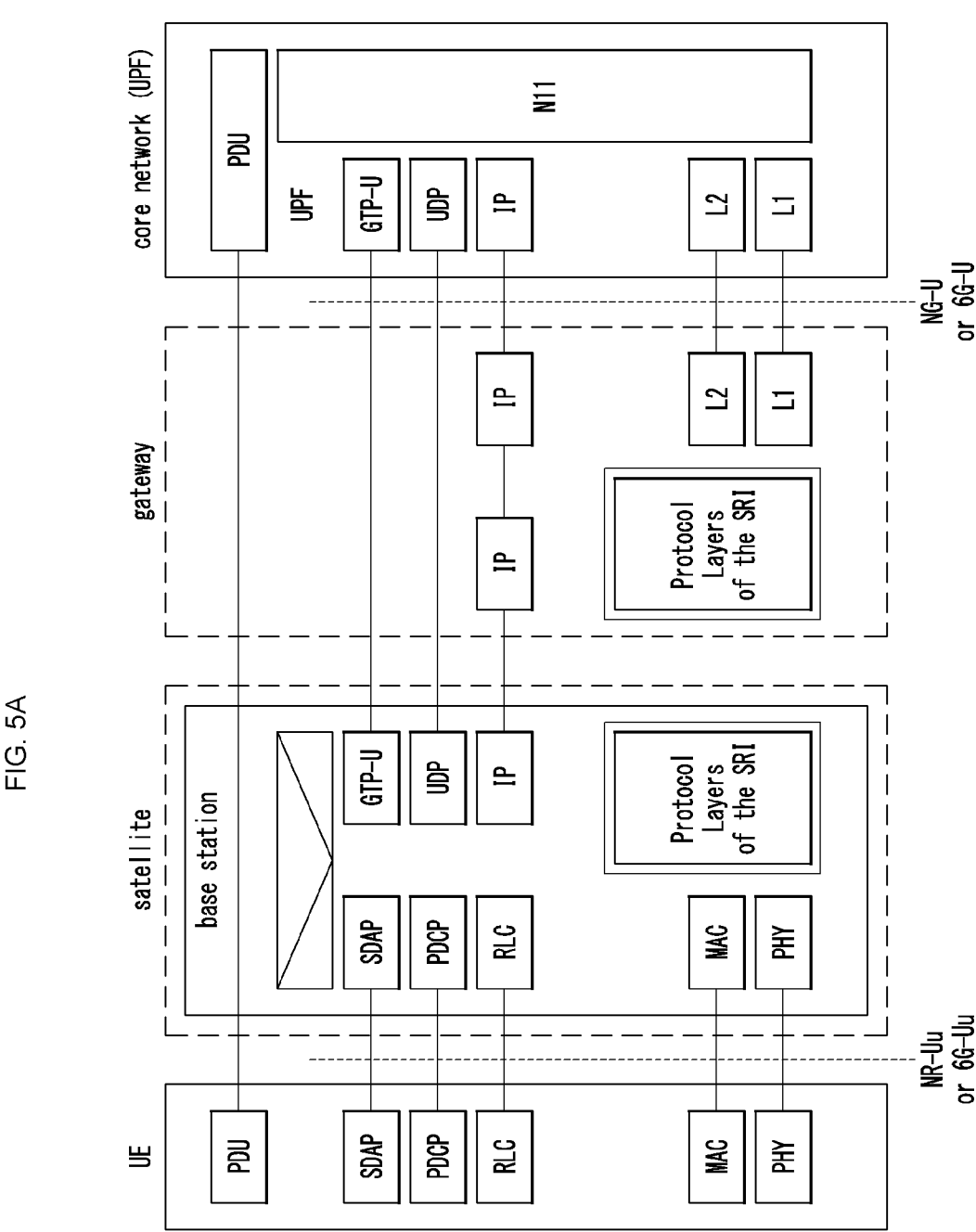
FIG. 5A is a conceptual diagram illustrating various exemplary embodiments of a protocol stack of a user plane in a regenerative payload-based non-terrestrial network.
Figure 5B:
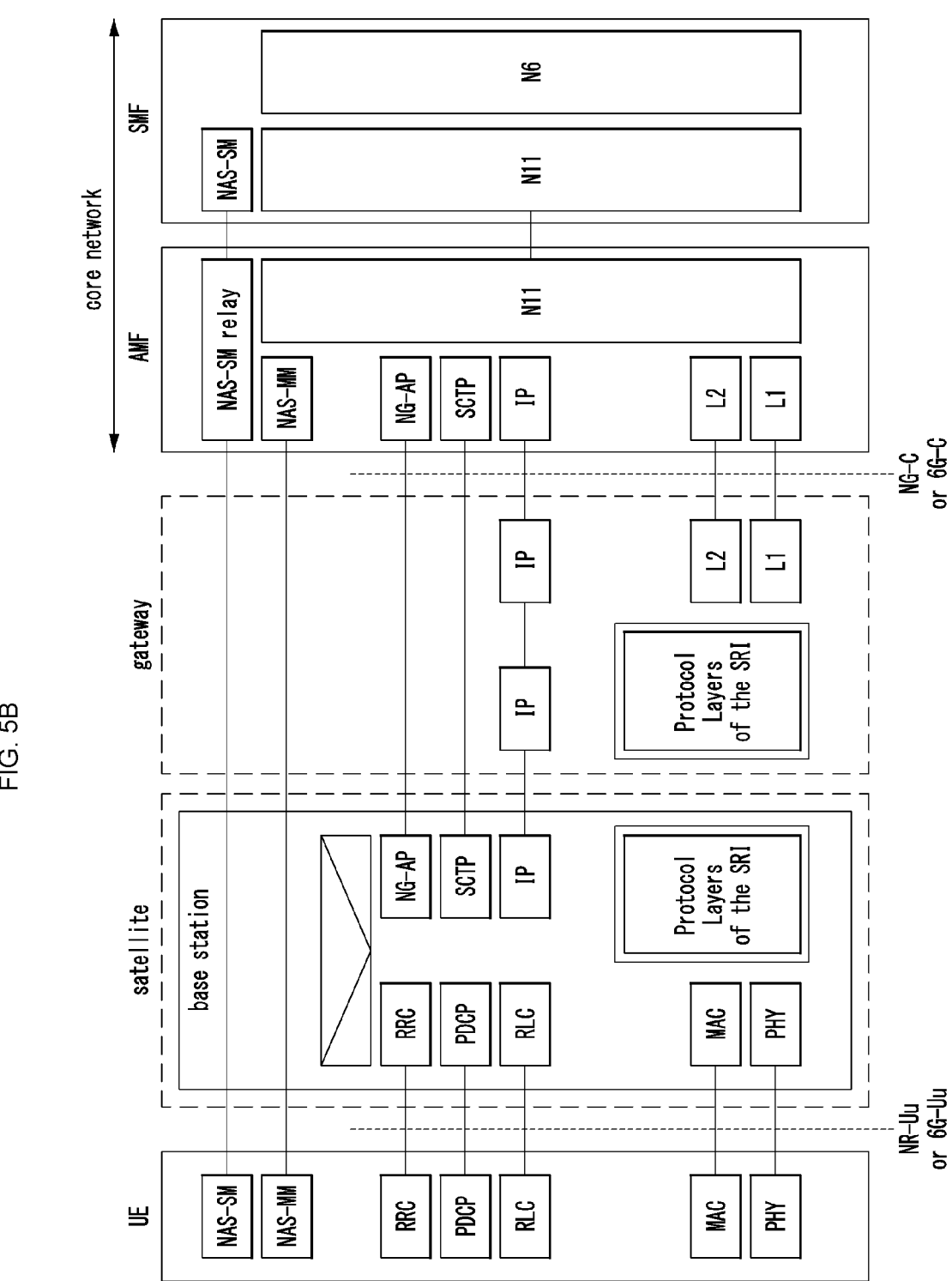
FIG. 5B is a conceptual diagram illustrating various exemplary embodiments of a protocol stack of a control plane in a regenerative payload-based non-terrestrial network.

FIG. 5A is a conceptual diagram illustrating a first exemplary embodiment of a protocol stack of a user plane in a regenerative payload-based non-terrestrial network, and FIG. 5B is a conceptual diagram illustrating a first exemplary embodiment of a protocol stack of a control plane in a regenerative payload-based non-terrestrial network.

As shown in FIGS. 5A and 5B, each of user data and control data (e.g. control information) may be transmitted and received through an interface between a UE and a satellite (e.g. base station). The user data may refer to a user protocol data unit (PDU). A protocol stack of a satellite radio interface (SRI) may be used to transmit and receive the user data and/or control data between the satellite and a gateway. The user data may be transmitted and received through a general packet radio service (GPRS) tunneling protocol (GTP)-U tunnel between the satellite and a core network.

Figure 6A:
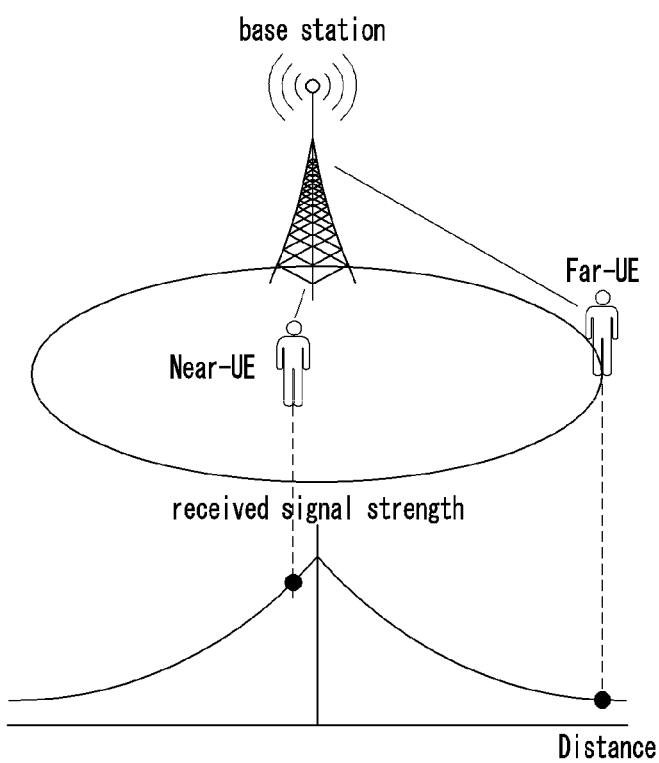
FIG. 6A is a conceptual diagram illustrating a measurement result of reference signal received powers (RSRPs) in a terrestrial network.
Figure 6B:
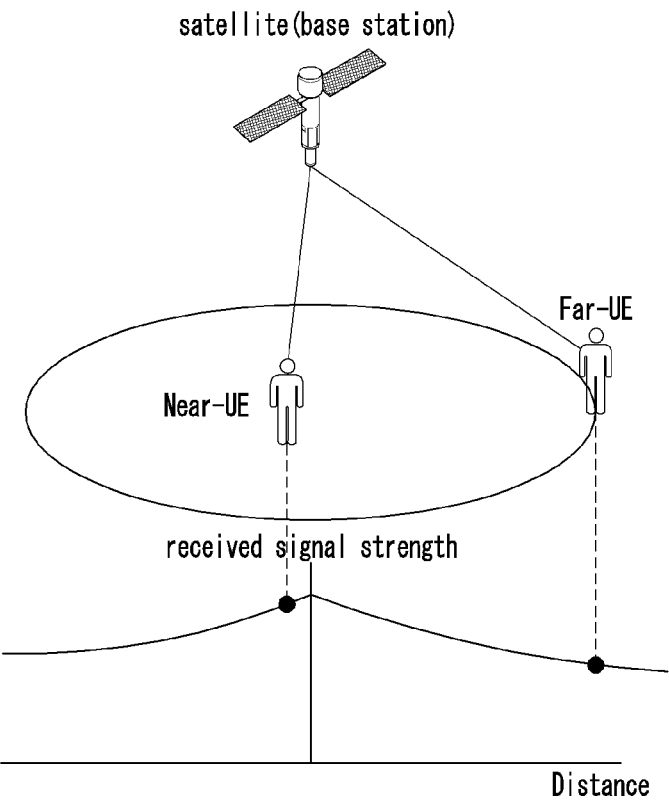
FIG. 6B is a conceptual diagram illustrating a measurement result of RSRPs in a non-terrestrial network.

FIG. 6A is a conceptual diagram illustrating a measurement result of reference signal received powers (RSRPs) in a terrestrial network, and FIG. 6B is a conceptual diagram illustrating a measurement result of RSRPs in a non-terrestrial network.

As shown in FIG. 6A, a path loss exponent may be assumed to be 4, and differences in RSRP according to distances (e.g. 100 meters (m), 500 m, 1 kilometer (km), and 10 km) from a base station in a terrestrial network may be as shown in Table 4 below. A reference position may be represented as a distance from the base station to the corresponding reference position.

TABLE 4

| Reference position | Distance from a base station | | | |
| | 100 m | 500 m | 1 km | 10 km |
|---|---|---|---|---|
| 100 ms | 0 dB | −28 dB | −40 dB | −80 dB |
| 500 ms | — | 0 dB | −12 dB | −52 dB |
| 1 km | — | — | 0 dB | −40 dB |
| 10 km | — | — | — | 0 dB |

As shown in FIG. 6B, in a non-terrestrial network, a path loss exponent may be assumed to be 2, and a satellite may be a LEO satellite with an altitude of 600 km. In the non-terrestrial network, a difference in RSRP according to a distance (e.g. 10 km, 50 km, 100 km, 500 km) between a nadir and a UE may be shown in Table 5 below. A distance between the satellite and the UE, depending on the distance between the nadir and the UE, may be 600 km, 602 km, 608 km, or 781 km.

TABLE 5

| Distance between nadir and UE | 10 km | 50 km | 100 km | 500 km |
|---|---|---|---|---|
| Distance between the satellite and the UE | 600 km | 602 km | 608 km | 781 km |
| Reference position (10 km) | 0 dB | | −0.1 dB | −2.3 dB |

In a satellite that supports multi-beam, if a cell radius is about 50 km, a difference in a path length may be small. A distance between the satellite and the UE at 500 km from the nadir is only 781 km, and a difference between an RSRP at 500 km from the nadir and an RSRP at 10 km from the nadir may be −2.3 dB.

Meanwhile, in a non-terrestrial network (NTN) environment, satellites may move at high speeds, requiring cell selection and/or reselection to ensure continuous services. Additionally, in the NTN, a distance between a satellite and a UE may be significantly larger than a cell size, and there may not be a substantial variation in the distance between the satellite and the UE within a cell coverage. Therefore, the legacy scheme based on reference signal received power (RSRP) may not deliver sufficient performance, unlike the case in a terrestrial network (TN). Accordingly, a cell selection method utilizing satellite ephemeris information and/or UE location information (e.g. global navigation satellite system (GNSS)-based UE location information) may need to be considered.

Figure 7:
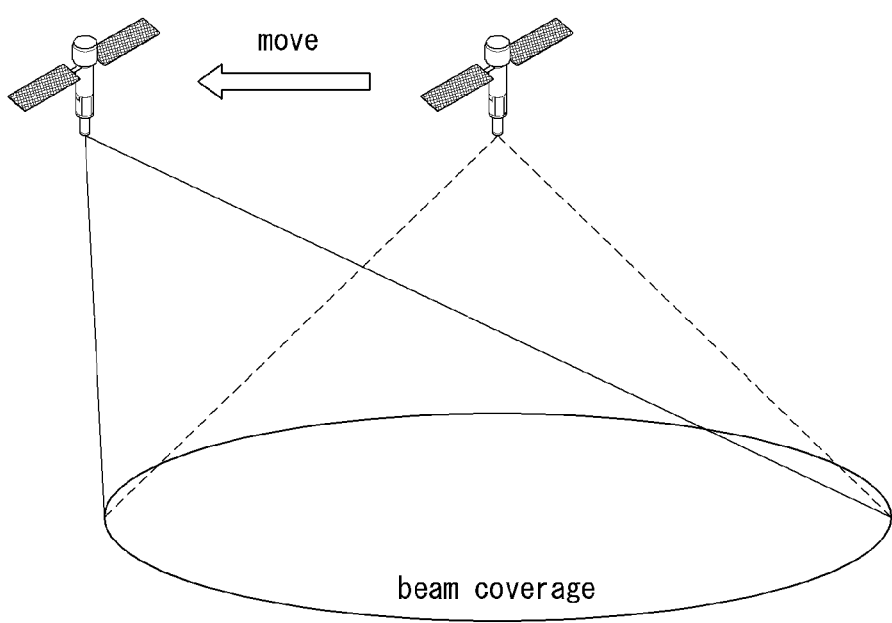
FIG. 7 is a conceptual diagram illustrating maintenance of a beam coverage independent of satellite movement in an earth fixed beam (EFB) environment.

FIG. 7 is a conceptual diagram illustrating maintenance of a beam coverage independent of satellite movement in an earth fixed beam (EFB) environment.

As shown in FIG. 7, a beam of a satellite may EFB characteristics. In the instant case, a cell coverage on the ground may be continuously fixed even as the satellite moves. For instance, in the EFB environment, the satellite can constantly serve the fixed cell coverage through beam steering and/or beam switching. Consequently, a cell service time (e.g. remaining cell service time), which is a remaining service time in a cell where the UE is located, may be assumed to be the same as (or similar to) a remaining service time in other locations of the satellite's coverage. The remaining cell service time may be a time during which communication services can be provided to the UE in the corresponding cell where the UE is located.

Figure 8:
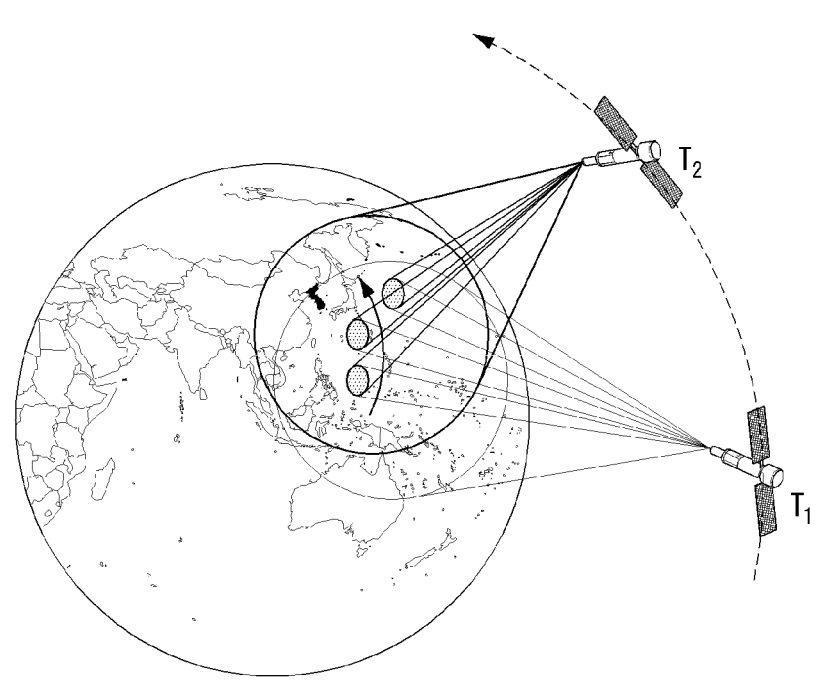
FIG. 8 is a conceptual diagram illustrating changes in a coverage of a satellite and/or cell in an EFB environment supporting multiple beams.

FIG. 8 is a conceptual diagram illustrating changes in a coverage of a satellite and/or cell in an EFB environment supporting multiple beams.

As shown in FIG. 8, a satellite may support EMB. One satellite may form a plurality of cells. The plurality of cells may be configured within a coverage (e.g., beam coverage) of the satellite. In the instant case, each cell may be serviced by one beam or multiple beams. Even when the satellite moves, the coverage of the satellite or locations of the cells may not change. In other words, while the satellite is visible, if an elevation angle thereof is above a certain value, services for the corresponding cell may be continuously provided.

In addition, aspects of cell maintenance time and/or satellite maintenance time may differ in an earth fixed beam (EFB)-based NTN and an EMB-based NTN. For example, in the EMB-based NTN, a cell may also move as a satellite moves, and continuous cell reselection may be required even when a UE is served by the same satellite. In the instant case, a cell maintenance time and a satellite maintenance time may be different from each other, and in general, the cell maintenance time may have a smaller value than the satellite maintenance time. On the other hand, in the EFB-based NTN, a cell coverage fixed to the ground surface may be maintained while a UE belongs to the same satellite through beam steering and/or beam switching until the UE leaves the satellite's coverage. Therefore, when the UE leaves the satellite's coverage, connection to a new satellite may be established. An efficient cell selection and/or reselection method is needed that takes into account the characteristics of the EFB-based NTN environment.

In the EFB-based NTN, at least one of a cell service time, which is a remaining service time in a cell, or a cell service timer for the cell service time may be introduced. In the NTN, a cell selection procedure may be performed based on the cell service timer.

The cell service timer may operate inside the UE. A base station (e.g. satellite) may configure a cell service timer and signal information on the cell service timer to the UE. Alternatively, the base station may signal an initial value of the cell service timer and/or information element(s) required to determine the cell service timer to the UE. The UE may receive the cell service timer, the initial value of the cell service timer, and/or the information element(s) required to determine the cell service timer from the base station.

Alternatively, the cell service timer may be predefined in the technical specifications. In the instant case, the cell service timer may not be signaled by the base station. That is, the UE may use the predefined cell service timer.

Cell Service Timer

The cell service timer may be referred to as cTimer. The cell service timer may be referred to as a cell expiration timer. The cell service timer may be a timer that defines a time (e.g., remaining time) during which communication services can be provided in the corresponding cell where the UE is located. The cell service timer may have the following characteristic(s).

The cell service timer may be an internal timer of the UE.

The cell service timer may be set to a cell-specific value.

Information on the cell service timer (e.g. value, initial value, setting value, and/or maximum value of the cell service timer) may be included in system information and/or RRC message. The satellite may periodically transmit the system information and/or RRC message including the information on the cell service timer. The information on the cell service timer may be transmitted in a broadcast manner. The UE may receive the information on the cell service timer from the satellite. The information on the cell service timer may include parameter(s) used to determine the value of the cell service timer. When the information on the cell service timer is transmitted periodically, information indicating a transmission periodicity of the information on the cell service timer may be signaled from the satellite to the UE. The transmission periodicity of the information on the cell service timer may be variably set based on the cell service timer.

Alternatively, the information on the cell service timer may be signaled from the satellite to the UE at a time of performing an initial access procedure, a time of performing a connection establishment procedure, and/or a time of handover. The information on the cell service timer may include information indicating the value (e.g. initial value, setting value, maximum value) and/or decrement interval of the cell service timer. The UE may independently determine the value of the cell service timer based on the information signaled from the satellite. For example, the UE may decrease the value of the cell service timer according to the decrement interval. When the above-described method is used, the information on the cell service timer may be signaled only once at a time of performing an initial access procedure, a time of performing a connection establishment procedure, and/or a time of handover.

In the EFB-based NTN, the value of the cell service timer may be the same as a value of a satellite (SAT) service timer (or SAT expiration timer). The SAT service timer may be referred to as sTimer. The SAT service timer may be a timer that defines a time (e.g. remaining time) during which communication services can be provided in a coverage of the satellite where the UE is located.

The UE may know at least one of ephemeris information of the satellite, location information of the UE (e.g. location information of the UE obtained through a GNSS), elevation angle information of the satellite, or information on a distance from the UE to the nadir.

When the cell service timer expires (e.g. when the cell service timer becomes 0), the UE may determine that a time during which communication services can be provided in the specific cell has expired.

To complement the accuracy of the cell service timer, reception quality information (e.g. RSRP, RSRQ, received signal strength indicator (RSSI)) may be used complementarily along with the cell service timer in a cell selection procedure (or handover procedure).

Figure 9:
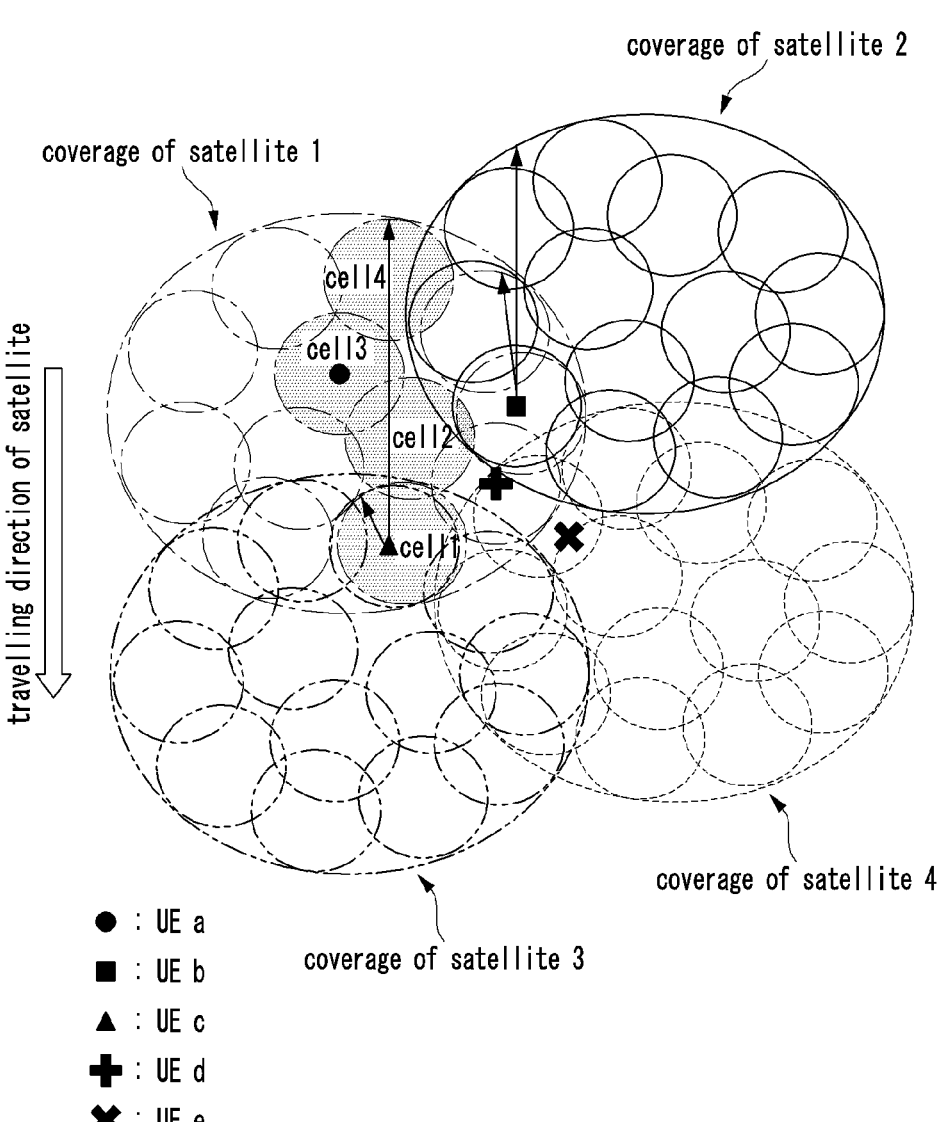
FIG. 9 is a conceptual diagram illustrating various exemplary embodiments of a cell selection method according to UE location in an EFB environment supporting multiple beams.

FIG. 9 is a conceptual diagram illustrating a first exemplary embodiment of a cell selection method according to UE location in an EFB environment supporting multiple beams.

As shown FIG. 9, in an EFB environment supporting multiple beams, satellites may be assumed to move, for example, in a downward direction. Since a UE a only falls within a coverage of one satellite that is a satellite 1, it may select the satellite 1 (or a cell served by the satellite 1). On the other hand, a UE b may be located in a region where the coverage of the satellite 1 and a coverage of a satellite 2 overlap. In the instant case, considering the travelling direction of the satellites, the UE b may have a longer cell service time when selecting a cell serviced by the satellite 2 than when selecting a cell serviced by the satellite 1. Therefore, in the instant case, the UE b may select the satellite 2 (or cell served by the satellite 2). In addition, a UE c may be located in a region where the coverage of the satellite 1 and a coverage of a satellite 3 overlap. In the instant case, considering the travelling direction of the satellites, the UE c may have a longer cell service time when selecting a cell serviced by the satellite 1 than when selecting a cell serviced by the satellite 3. Therefore, in the instant case, the UE c may select the satellite 1 (or cell served by the satellite 1).

For reference, in case of the EMB environment, the UE c may change its cell from cell 1→cell 2→cell 3→cell 4 as the satellite moves. On the other hand, in case of the EFB environment, services can continue to be provided through beam steering and/or beam switching even when the satellite moves, so that the UE may maintain the cell 1 until the satellite leaves a preconfigured range.

Meanwhile, a UE d and/or UE e may be located in a region where the coverage of the satellite 1 and a coverage of a satellite 4 partially overlap. If all UEs located in the overlapped region select a cell served by the satellite 1, a load unbalance problem may occur. Therefore, for cell selection in the EFB environment, not only the cell service timer but also at least one of reception quality (e.g. RSRP), distance between the UE and the satellite, elevation angle, or distance from a center of the cell to a nadir may be used. That is, when selecting a cell, the UE may consider a remaining time of a cell service timer of the cell to receive a long service time, and may consider an RSRP to select a cell that provides good channel quality. In addition, when selecting a cell, the UE may consider a distance between a satellite and the UE to select a cell with a short distance between the satellite and the UE, and the UE may consider an elevation angle between a satellite and the UE to select a cell with a large elevation angle. Additionally, when selecting a cell, the UE may consider a distance between a center of the cell and a nadir to select a cell with a short distance between a center of the cell and a nadir.

Variable Measurement Procedure

In an LEO-based NTN, if a UE selects a specific cell of a satellite (e.g. LEO satellite), a possibility that a connection between the UE and the specific cell is maintained for a predetermined time may be large considering an orbit and/or movement speed of the satellite. If a value of a cell service timer cTimer is large, a possibility of selecting a new cell in the NTN where the satellite's orbit is deterministic may be low. Therefore, a need for measurement procedures may be low. On the other hand, when the value of the cell service timer is decreased or when the value of the cell service timer is equal to or less than a certain threshold, it may be necessary for measurement procedures to be performed frequently.

If the value of the cell service timer exceeds a specific threshold, intermittent measurement procedures (e.g. first measurement procedures) may be performed. If the value of the cell service timer is equal to or less than the specific threshold, frequent measurement procedures (e.g. second measurement procedures) may be performed. A measurement periodicity for the intermittent measurement procedures may be longer than a measurement periodicity for the frequent measurement procedures, and a measurement reporting periodicity (e.g. a reporting periodicity of measurement results) for the intermittent measurement procedures may be longer than a measurement reporting periodicity for the frequent measurement procedures. The RSRP thresholds may be set independently for the intermittent and frequent measurement procedures.

The satellite may signal, to the UE, configuration information (e.g. measurement periodicity, measurement reporting periodicity, and/or RSRP threshold) of the intermittent measurement procedures, configuration information (e.g. measurement periodicity, measurement reporting periodicity, and/or RSRP threshold) of the frequent measurement procedures, and/or the specific threshold for the value of the cell service timer. The UE may receive, from the satellite, the configuration information of the intermittent measurement procedures, configuration information of the frequent measurement procedures, and/or the specific threshold for the value of the cell service timer. If the value of the cell service timer exceeds the specific threshold, the UE may perform the intermittent measurement procedures based on the configuration information signaled from the satellite. If the value of the cell service timer is equal to or less than the specific threshold, the UE may perform the frequent measurement procedures based on the configuration information signaled from the satellite. According to the above-described method, the power consumption of the UE due to performing unnecessary measurement procedures can be reduced, and signaling overhead according to the measurement reporting procedures can be reduced.

In the EFB-based NTN, a connection between the UE and the corresponding cell (or satellite) may be maintained for a time corresponding to the cell service timer (e.g. a time until the cell service timer becomes 0). That is, in the EFB-based NTN, the UE may maintain connectivity with the currently-connected satellite during the cell service time, and thus the cell service time (e.g. cell service timer) and a SAT service time (e.g. SAT service timer) may be the same (or similar). Accordingly, it may be necessary for measurement procedures to be performed taking into account the above-described satellite operation plan.

In the EFB-based NTN, the measurement periodicity and/or measurement reporting periodicity may be variably set based on the cell service timer. In the instant case, the performance of the measurement procedures for cell (re) selection may not be degraded and the measurement overhead may be reduced. That is, the UE's power consumption due to unnecessary measurements can be reduced, and signaling overhead due to the measurement reports can be reduced.

The cell service timer may be assigned (e.g. set) at a time when the UE selects a new cell (e.g. new serving cell, target cell). A multi-beam-based satellite may form (e.g. configure) a plurality of cells. A value (e.g. setting value, initial value) of each cell service timer may vary depending on the location of the satellite, location of the cell, and/or location of the UE. A value (e.g. setting value, initial value) of each cell service timer may be calculated based on at least one of ephemeris information of the satellite, information related to the cell, or location information of the UE.

If the value of the cell service timer is equal to or less than a first threshold, this may mean that a cell selection procedure needs to be performed. If the value of the cell service timer is less than or equal to the first threshold, the UE may perform measurement procedures for cell selection. If the value of the cell service timer is less than or equal to the first threshold, the UE may perform the intermittent measurement procedures. Alternatively, the UE may not perform the measurement procedures. If the value of the cell service timer is equal to or less than the first threshold, the UE may perform the frequent measurement procedures. According to the above-described method, the number of times the measurement procedure is performed can be reduced.

As another method, the measurement procedures (e.g. intermittent measurement procedures and/or frequent measurement procedures) may be performed independent of the value of the cell service timer. Since the UE moves to another cell depending on the location and/or mobility (e.g. speed and/or direction) of the UE, the measurement procedures may be performed taking into account the location and/or mobility of the UE. For example, if the UE's speed exceeds a speed threshold, the UE may perform the frequent measurement procedures. If the UE's speed is below the threshold, the UE may perform the intermittent measurement procedures.

The minimum value of the measurement periodicity may be 20 milliseconds (ms). The measurement periodicity may be set based on Equation 1 below. The measurement reporting periodicity (i.e. reporting periodicity of measurement results) may be set to be the same as the measurement periodicity.

$$\text{measurement periodicity} = 20\,\text{msec} \times 2^{n} \qquad \text{[Equation 1]}$$

In Equation 1, n may be determined based on Equation 2 below.

$$n = \left\lfloor N \times f\left( \frac{cTimer}{\text{CTimer\_max}} \cdot \frac{1}{sTimer} \right) \right\rfloor \qquad \text{[Equation 2]}$$

N, cTimer_max, and/or f(x) may be configured by the base station to the UE. Alternatively, N, cTimer_max, and/or f(x) may be predefined in the technical specifications. Alternatively, N, cTimer_max, and/or f(x) may be determined by the UE. cTimer_max may be the maximum value of the cell service timer. cTimer may be the value (e.g. current value)

of the cell service timer. sTimer may be the value (e.g. current value) of the SAT service timer. N may be a natural number.

The UE may determine the measurement periodicity based on Equation 1 and Equation 2, identify the reception quality (e.g. RSRP, RSRQ, RSSI) of the satellite (e.g. base station) by performing measurement operations based on the measurement periodicity, and report the measurement results (e.g. reception quality) to the satellite (e.g. base station). The reporting periodicity of the measurement results may be set to be the same as or different from the measurement periodicity. In addition, the satellite may estimate the measurement periodicity and/or measurement reporting periodicity from the UE based on Equation 1 and Equation 2, and may receive measurement results from the UE based on the measurement periodicity and/or measurement reporting periodicity.

As another method, n in Equation 1 may be set based on Table 6 below. The satellite may signal the information of Table 6 to the UE. The UE may receive the information of Table 6 from the satellite. Alternatively, Table 6 may be predefined in the technical specifications. In Table 6, cTimer may be the value (e.g. current value) of the cell service timer.

TABLE 6

| CTimer | 20 min | 10 min | . . . | 20 msec |
|--------|--------|--------|-------|---------|
| n | X1 | X2 | . . . | 0 |

The UE may determine the measurement periodicity based on Equation 1 and Table 6, identify the reception quality (e.g. RSRP, RSRQ, RSSI) of the satellite (e.g. base station) by performing measurement operations based on the measurement periodicity, and report the measurement results (e.g. reception quality) to the satellite (e.g. base station). The reporting periodicity of the measurement results may be set to be the same as or different from the measurement periodicity. In addition, the satellite may estimate the measurement periodicity and/or measurement reporting periodicity from the UE based on Equation 1 and Table 6, and may receive measurement results from the UE based on the measurement periodicity and/or measurement reporting periodicity.

A time of performing the measurement reporting procedure may be configured with an offset (hereinafter referred to as 'reporting offset') with respect to a time of performing the measurement procedure. The satellite may set a reporting offset and signal information on the reporting offset to the UE. The UE may receive the information on the reporting offset from the satellite. The UE may perform a measurement procedure and perform a measurement reporting procedure after the reporting offset from the time of performing the measurement procedure. The satellite may receive measurement results from the UE considering the reporting offset. Alternatively, the reporting offset may be predefined in the technical specifications. Alternatively, the reporting offset may be set by the UE.

When selecting a cell, the UE may receive a value of a cell service time (e.g. cell service timer) from the satellite. Additionally, the UE may receive at least one of RSRP, satellite-UE distance, elevation angle, distance to a nadir, or ephemeris information through system information transmitted from the satellite. In case of the EMB-based NTN, a different cell service time may be given for each cell depending on the movement of the satellite. In the EMB-based NTN, the cell service time may be decreased at a regular time interval and broadcast from the satellite. In the instant case, the time interval at which the cell service time is decreased may be set variably according to the characteristics of the satellite (e.g. speed of the satellite). That is, in case of a fast-moving satellite, the time interval at which the cell service time is decreased may be set to be short.

Meanwhile, in the EFB-based NTN, it may be necessary to distinguish between cell selection and cell reselection. Cell selection may be performed when the UE is powered on. Cell reselection may be performed when a satellite from which the UE is to receive services changes, and a difference thereof is that it is triggered when a remaining service time of a currently connected cell falls is equal to or less than a preset value. Thereafter, a process of cell reselection may be performed in the same (or similar) manner as in the process of cell selection.

First, in case of cell selection, if a specific area is served by a single cell, the UE may only receive a service time and/or a cell service timer value of the single cell, and the UE may select the corresponding cell based on the service time and/or service timer value of the single cell. On the other hand, when a specific area is served by multiple cells, the UE may perform cell selection based on multiple cell service times and/or cell service timer values. Cell selection may be performed individually in each UE. Hereinafter, a cell selection procedure of the UE, which is performed in the EFB environment supporting multiple beams, will be described.

Figure 10:
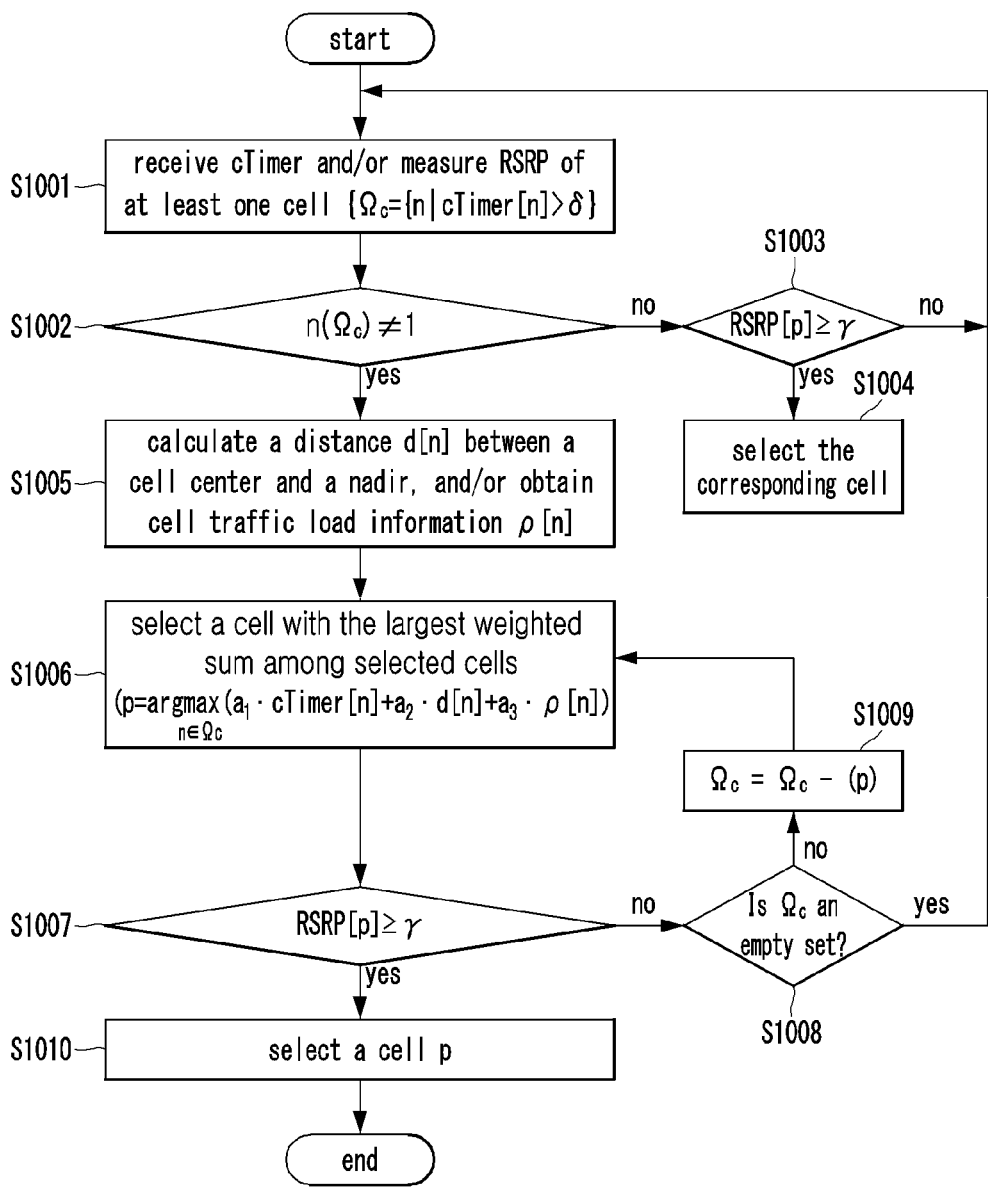
FIG. 10 is a flowchart illustrating various exemplary embodiments of a cell selection procedure in an EFB environment supporting multiple beams.

FIG. 10 is a flowchart illustrating a first exemplary embodiment of a cell selection procedure in an EFB environment supporting multiple beams.

As shown in FIG. 10, an NTN may include at least one satellite and a UE. The satellite may form a plurality of cells and perform base station functions. That is, the satellite may include a base station. Operations of the cell may be operations of the base station and/or operations of the satellite. The UE may perform a cell selection procedure when it is powered on. The UE may receive information on cell service time(s) (e.g. cell service timer(s) (cTimer[n])) of at least one cell, and perform measurement on reception quality(ies) (e.g. RSRP) for the at least one cell (S1001). The UE may receive a synchronization signal (SS)/physical broadcast channel (PBCH) block for RSRP measurement.

The UE may identify cTimer, cTimer decrement interval, and/or cTimer threshold based on one or more information elements defined in Table 7 below. Alternatively, cTimer, cTimer decrement interval, and/or cTimer threshold may be predefined in the technical specifications. In the instant case, the UE may know cTimer, cTimer decrement interval, and/or cTimer threshold without signaling from the satellite 1.

TABLE 7

| Information elements |
|----------------------|
| CTimer (e.g. initial value, setting value, and/or maximum value of CTimer) |
| Parameter(s) for determining CTimer |
| Decrement interval of CTimer |
| Parameter(s) for determining the decrement interval of CTimer |
| CTimer threshold (e.g. first threshold T1) |

Alternatively, the UE may receive, from the satellite, configuration information of the cell service timer(s) of the at least one cell (e.g. service time(s) of the at least one cell, ephemeris information of the satellite, location information of the UE (e.g. location information of the UE obtained through a GNSS), information on a distance from the UE to a center of each cell, and/or information on a distance from the center of each cell center to the nadir) and/or RSRP(s). Here, n may represent an index of a cell from which the UE received the value of the cell service timer. The number of cells from which the UE receives cTimer values and/or RSRP may be preset to a maximum of N. In the instant case, the measurement periodicity and/or measurement reporting periodicity may be set variably. To this end, the UE may receive configuration information on the measurement periodicity and/or measurement reporting periodicity from the satellite. The UE may periodically receive cTimer values from the satellite. Among the cells from which the UE has received the cell service timer value, the UE may define a set (hereinafter referred to as 'candidate cell set') of cells whose cell service timer values exceed a preset first value (e.g., timer margin $\delta$) as in Equation 3 below.

$$\Omega_c = \{n | CTimer[n] > \delta\} \qquad \text{[Equation 3]}$$

The UE may determine whether the number of elements (or number of cells) of the candidate cell set is 1 (S1002). If the number of elements in the candidate cell set is 1 (i.e., $n(\Omega_c)=1$), the UE may determine whether an RSRP value of the corresponding cell is greater than or equal to a second value (e.g. RSRP threshold $\gamma$) (S1003). If the RSRP value of the corresponding cell is less than the second value (e.g. RSRP threshold $\gamma$) (S1003), the UE may determine that the cell selection procedure fails and perform the procedure again from the step S1001. On the other hand, if the RSRP value of the corresponding cell is greater than or equal to the second value (e.g. RSRP threshold $\gamma$) (S1003), the UE may select the corresponding cell (S1004).

On the other hand, if the number of elements in the candidate cell set is not 1 (i.e. $n(\Omega_c)\neq1$) (S1002), for a cell n belonging the candidate cell set, the UE may calculate a distance (e.g. d[n] in Equation 4 below) between a center of the cell and the nadir of the satellite (S1005). In addition, when traffic load information of the corresponding cell is provided, the UE may calculate traffic load information (e.g. $\rho[n]$) of the corresponding cell n belonging to the candidate cell set (S1005). The above-described first value and/or traffic load information of the cell may be configured to the UE by the base station. Alternatively, the first value and/or traffic load information of the cell may be predefined in the technical specifications. Alternatively, the first value and/or traffic load information of the cell may be determined by the UE.

$d[n]$ = distance between a nair $\qquad$ [Equation 4]

of satellite and a center of cell $n, n \in \Omega_c$

Then, the UE may select a cell p with the largest weighted sum among cells belonging to the candidate cell set as a candidate cell (S1006). For example, the UE may determine the above-described weighted sum as cTimer[n]+d[n], and the UE may select a cell p with the largest weighted sum as the candidate cell. Alternatively, the UE may determine the above-described weighted sum as cTimer[n]+$\rho$[n], and the UE may select a cell p with the largest weighted sum as the candidate cell. Alternatively, the UE may determine the weighted sum as shown in Equation 5 below, and the UE may select a cell p with the largest weighted sum as the candidate cell. Here, $\alpha_1$, $\alpha_2$, and $\alpha_3$ may be parameters configurable as weights and may be set to the UE by the base station. Alternatively, $\alpha_1$, $\alpha_2$, and $\alpha_3$ may be predefined in the technical specifications. Alternatively, $\alpha_1$, $\alpha_2$, and $\alpha_3$ may be determined by the UE.

$$p = \arg \max_{n \in \Omega_c}(\alpha_1 \cdot CTimer[n] + \alpha_2 \cdot d[n] + \alpha_3 \cdot \rho[n]) \qquad \text{[Equation 5]}$$

Then, the UE may determine whether the RSRP of the candidate cell p is greater than or equal to the preset second value (e.g. RSRP threshold $\gamma$) (S1007). If the RSRP of the candidate cell p is less than the second value (RSRP [p]<$\gamma$), the UE may determine whether $\Omega_c$ (or 'the above-described candidate cell set $\Omega_c$—the number of candidate cells whose RSRP is determined to be less than the second threshold in the step S1008') is an empty set (S1008). If $\Omega_c$ is not an empty set (S1008), the UE may select a cell with the second largest weighted sum among cells belonging to the candidate cell set as a candidate cell p (S1009). That is, the UE may perform an operation $\Omega_c=\Omega_c-\{p\}$, and perform again from the step S1007. This process may be repeated until the set $\Omega_c$ becomes an empty set. When $\Omega_c$ is an empty set (S1008), the UE may determine that the cell selection procedure fails and perform the procedure again from the step S1001.

On the other hand, if the RSRP of the candidate cell p is greater than or equal to the second value (RSRP[p]≥$\gamma$) (S1007), the UE may finally select the candidate cell (S1010). The above-described second value may be set in the UE by the base station. Alternatively, the second value may be predefined in the technical specifications. Alternatively, the second value may be determined by the UE. The above-described operation may be jointed with the RSRP-based legacy scheme.

The UE may be connected to a satellite associated with the selected cell. That is, a connection establishment procedure may be performed between the UE and the satellite. The connection establishment procedure may mean an initial access procedure and may include a synchronization acquisition procedure between the UE and the satellite. In the connection establishment procedure between the UE and the satellite, the satellite may transmit cell (re)selection configuration information and/or measurement configuration information (e.g. variable measurement configuration information) to the UE. The UE may receive the cell (re)selection configuration information and/or measurement configuration information from the satellite. The cell (re)selection configuration information may include one or more information elements defined in Table 7 above. The variable measurement configuration information may include one or more information elements defined in Table 8 below. The UE may identify the measurement periodicity and/or measurement reporting periodicity based on the one or more information elements defined in Table 8 below. Alternatively, the measurement periodicity and/or measurement reporting periodicity may be predefined in the technical specifications. In the instant case, the UE may know the measurement periodicity and/or measurement reporting periodicity without signaling from the satellite.

TABLE 8

| Information elements |
| --- |
| Measurement periodicity |
| Parameter(s) for determining measurement periodicity (e.g. n, N, and/or CTimer_max in Equations 1 and 2) |
| Measurement reporting periodicity |
| Parameter(s) for determining measurement reporting periodicity |

The measurement periodicity and/or measurement reporting periodicity defined in Table 8 may be used for variable measurement procedures. The variable measurement procedures may be distinguished from the general measurement procedures. The measurement periodicity for the variable measurement procedures may be shorter than that for the general measurement procedures. The measurement reporting periodicity for the variable measurement procedures may be shorter than the measurement reporting periodicity for the general measurement procedures. Configuration information for the general measurement procedures (e.g. measurement periodicity and/or measurement reporting periodicity) may be signaled in the connection establishment procedure between the UE and the satellite. The general measurement procedures may refer to relaxed measurement procedures.

The UE may measure received signal quality(ies) (e.g. RSRP, RSRQ, RSSI) for cell(s) and/or satellite(s) by performing the general measurement procedures. If a preconfigured condition is met, the UE may measure received signal quality (ies) (e.g. RSRP, RSRQ, RSSI) for the cell(s) and/or satellite(s) by performing the variable measurement procedures instead of the general measurement procedures. For example, the preconfigured condition may be a case when cTimer is equal to or less than the cTimer threshold (e.g. T1).

Meanwhile, when the connection establishment procedure between the UE and the satellite is completed, communication (e.g. downlink communication and/or uplink communication) between the UE and the satellite may be performed. The UE may operate (e.g. start) cTimer from a time it is connected to a cell of the satellite (e.g. a time it accesses the cell of the satellite). If the value of cTimer is less than or equal to T1, the UE may perform the variable measurement procedures. Alternatively, the UE may perform the general measurement procedures even if the above-mentioned condition is satisfied.

Thereafter, when the value of cTimer falls below a preset value, a cell reselection procedure of the UE may be triggered. When the cell reselection procedure is triggered, the UE may perform the cell reselection procedure in the same (or similar) manner as in the case of cell selection described above.

The methods according to an exemplary embodiment of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

In addition, the terms such as "unit", "module", etc. disclosed in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless particularly stated otherwise, a singular expression includes a plural expression unless the context clearly indicates otherwise.

In the exemplary embodiment of the present disclosure, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of a user equipment (UE), the method comprising:

receiving, by a processor, configuration information of a cell service timer for each of at least one cell from a satellite;

decreasing, by the processor, the cell service timer indicating a time during which communication services can be provided for each of the at least one cell;

determining, by the processor, a candidate cell set including one or more cells for which the cell service timer exceeds a first preset value; and performing, by the processor, a cell selection procedure for one cell belonging to the candidate cell set, wherein the configuration information of the cell service timer for each of the at least one cell includes at least one of a value of the cell service timer for each of the at least one cell, location information of the UE, ephemeris information of the satellite, or elevation angle information of the satellite.

2. The method of claim 1, wherein the performing of the cell selection procedure for one cell belonging to the candidate cell set includes:

determining whether a number of cells belonging to the candidate cell set is 1; and determining whether a reception quality of a first cell belonging to the candidate cell set exceeds a preset second value, wherein upon concluding that the number of cells belonging to the candidate cell set is 1 and the reception quality of the first cell exceeds the preset second value, the first cell belonging to the candidate cell set is selected.

3. The method of claim 1, wherein the performing of the cell selection procedure for one cell belonging to the candidate cell set includes:

determining whether a number of cells belonging to the candidate cell set is 1;

in response that the number of cells belonging to the candidate cell set is not 1, determining a distance between a center of each of a plurality of cells belonging to the candidate cell set and a nadir of the satellite; and selecting a candidate cell based on the distance between the center of each of the plurality of cells and the nadir of the satellite.

4. The method of claim 1, wherein the performing of the cell selection procedure for one cell belonging to the candidate cell set includes:

determining whether a number of cells belonging to the candidate cell set is 1;

in response that the number of cells belonging to the candidate cell set is not 1, determining traffic load information of a plurality of cells belonging to the candidate cell set; and selecting a candidate cell based on the traffic load information of the plurality of cells.

5. The method of claim 4, wherein the performing of the cell selection procedure for one cell belonging to the candidate cell set includes:

determining whether a reception quality of the candidate cell exceeds a second preset value.

6. The method of claim 1, further including:

receiving, by the processor, variable measurement configuration information from the satellite; and performing, by the processor, variable measurement procedures instead of general measurement procedures based on the variable measurement configuration information, wherein a measurement periodicity for the variable measurement procedures is shorter than a measurement periodicity for the general measurement procedures.

7. The method of claim 6, wherein the variable measurement configuration information includes intermittent measurement configuration information and frequent measurement configuration information, intermittent measurement procedures are performed based on the intermittent measurement configuration information when a cell service timer of a cell selected in the cell selection procedure exceeds a threshold, and frequent measurement procedures are performed based on the frequent measurement configuration information when the cell service timer of the cell selected in the cell selection procedure is equal to or less than the threshold.

8. The method of claim 1, further including, after the performing of the cell selection procedure, triggering, by the processor, a cell reselection procedure when a cell service timer of a cell selected in the cell selection procedure is equal to or less than a threshold.

9. A user equipment (UE) comprising:

a processor; and a memory storing one or more instructions executable by the processor, wherein the one or more instructions are executed by the processor to perform:

receiving, by the processor, configuration information of a cell service timer for each of at least one cell from a satellite;

decreasing the cell service timer indicating a time during which communication services can be provided for each of the at least one cell;

determining a candidate cell set including one or more cells for which the cell service timer exceeds a first preset value; and performing a cell selection procedure for one cell belonging to the candidate cell set, wherein the configuration information of the cell service timer for each of the at least one cell includes at least one of a value of the cell service timer for each of the at least one cell, location information of the UE, ephemeris information of the satellite, or elevation angle information of the satellite.

10. The UE of claim 9, wherein the one or more instructions are further executed by the processor to perform:

determining whether a number of cells belonging to the candidate cell set is 1; and determining whether a reception quality of a first cell belonging to the candidate cell set exceeds a preset second value, wherein upon concluding that the number of cells belonging to the candidate cell set is 1 and the reception quality of the first cell exceeds the preset second value, the first cell belonging to the candidate cell set is selected.

11. The UE of claim 9, wherein the one or more instructions are further executed by the processor to perform:

determining whether a number of cells belonging to the candidate cell set is 1;

in response that the number of cells belonging to the candidate cell set is not 1, determining a distance between a center of each of a plurality of cells belonging to the candidate cell set and a nadir of the satellite; and selecting a candidate cell based on the distance between the center of each of the plurality of cells and the nadir of the satellite.

12. The UE of claim 9, wherein the one or more instructions are further executed by the processor to perform:

determining whether a number of cells belonging to the candidate cell set is 1;

in response that the number of cells belonging to the candidate cell set is not 1, determining traffic load information of a plurality of cells belonging to the candidate cell set; and selecting a candidate cell based on the traffic load information of the plurality of cells.

13. The UE of claim 12, wherein the one or more instructions are further executed by the processor to perform determining whether a reception quality of the candidate cell exceeds a second preset value.

14. The UE of claim 9, wherein the one or more instructions are further executed by the processor to perform:

receiving variable measurement configuration information from the satellite; and performing variable measurement procedures instead of general measurement procedures based on the variable measurement configuration information, wherein a measurement periodicity for the variable measurement procedures is shorter than a measurement periodicity for the general measurement procedures.

15. The UE of claim 14, wherein the variable measurement configuration information includes intermittent measurement configuration information and frequent measurement configuration information, intermittent measurement procedures are performed based on the intermittent measurement configuration information in response that a cell service timer of a cell selected in the cell selection procedure exceeds a threshold, and frequent measurement procedures are performed based on the frequent measurement configuration information in response that the cell service timer of the cell selected in the cell selection procedure is equal to or less than the threshold.

16. The UE of claim 9, wherein the one or more instructions are further executed by the processor to perform, after the performing of the cell selection procedure, triggering a cell reselection procedure when a cell service timer of a cell selected in the cell selection procedure is equal to or less than a threshold.

* * * * *